US010952051B2

(12) United States Patent
Lee et al.

(10) Patent No.: US 10,952,051 B2
(45) Date of Patent: Mar. 16, 2021

(54) CORE NETWORK CONNECTIONLESS SMALL DATA TRANSFER

(71) Applicant: QUALCOMM Incorporated, San Diego, CA (US)

(72) Inventors: Soo Bum Lee, San Diego, CA (US); Stefano Faccin, San Ysidro, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 15/460,142

(22) Filed: Mar. 15, 2017

(65) Prior Publication Data

US 2018/0007557 A1    Jan. 4, 2018

Related U.S. Application Data

(60) Provisional application No. 62/357,910, filed on Jul. 1, 2016.

(51) Int. Cl.
*G06F 7/04* (2006.01)
*G06F 15/16* (2006.01)
(Continued)

(52) U.S. Cl.
CPC ............ *H04W 4/70* (2018.02); *H04L 9/3247* (2013.01); *H04L 9/3271* (2013.01); *H04L 63/08* (2013.01); *H04L 63/0823* (2013.01); *H04L 63/10* (2013.01); *H04L 67/12* (2013.01); *H04W 12/0401* (2019.01); *H04W 12/0609* (2019.01); *H04W 12/08* (2013.01); *H04W 48/18* (2013.01);
(Continued)

(58) Field of Classification Search
CPC ..... H04W 4/70; H04W 72/042; H04W 12/04; H04W 12/06; H04W 12/08; H04W 48/18; H04W 12/0609; H04W 12/0401; H04L 63/10; H04L 63/0823; H04L 67/12; H04L 63/08; H04L 9/3271; H04L 9/3247; H04L 2209/805
See application file for complete search history.

(56) References Cited

U.S. PATENT DOCUMENTS 6,225,888 B1 *  5/2001  Juopperi ............ H04L 63/0407
                                              340/5.8
9,300,473 B2     3/2016  Nix
                         (Continued)

OTHER PUBLICATIONS

International Search Report and Written Opinion—PCT/US2017/039051—ISA/EPO—dated Aug. 11, 2017.

*Primary Examiner* — Trong H Nguyen

(57) ABSTRACT

Connectionless data transfer is disclosed. Authentication of a device and network node may be performed when data is sent from the device to an application server of an application service provider via a selected network. The transfer of data may take place in an absence of an existing device context between the network node interacting with the device and the core network through which the data travels. State management overhead and signaling overhead may be reduced by use of the exemplary aspects disclosed herein. For example, the device does not need to perform an authentication and key agreement (AKA) procedure to transfer the data and an existing (or pre-existing) device context need not be maintained at the core network.

2 Claims, 16 Drawing Sheets

(51) Int. Cl.
*H04L 29/06* (2006.01)
*H04W 4/70* (2018.01)
*H04L 9/32* (2006.01)
*H04L 29/08* (2006.01)
*H04W 12/04* (2021.01)
*H04W 12/06* (2021.01)
*H04W 12/08* (2021.01)
*H04W 48/18* (2009.01)
*H04W 72/04* (2009.01)

(52) U.S. Cl.
CPC ..... *H04W 72/042* (2013.01); *H04L 2209/805* (2013.01)

(56) References Cited

U.S. PATENT DOCUMENTS

| | | | |
|---|---|---|---|
| 9,432,928 B1* | 8/2016 | Keller | H04W 48/20 |
| 2011/0271330 A1* | 11/2011 | Zhang | H04L 63/0838 |
| | | | 726/5 |
| 2012/0213165 A1* | 8/2012 | Miklos | H04W 12/06 |
| | | | 370/329 |
| 2013/0155954 A1 | 6/2013 | Wang et al. | |
| 2013/0301611 A1* | 11/2013 | Baghel | H04W 12/001 |
| | | | 370/331 |
| 2016/0127894 A1* | 5/2016 | Kahn | H04W 12/04 |
| | | | 380/270 |
| 2016/0127968 A1 | 5/2016 | Velev et al. | |

* cited by examiner

CORE NETWORK CONNECTIONLESS SMALL DATA TRANSFER

PRIORITY CLAIM

This application claims priority to and the benefit of provisional patent application No. 62/357,910 filed in the United States Patent and Trademark Office on Jul. 1, 2016, the entire content of which is incorporated herein by reference as if fully set forth below in its entirety and for all applicable purposes.

INTRODUCTION

Aspects of the present disclosure relate generally to wireless communication and more particularly, but not exclusively, to techniques for connectionless data transfer in scenarios where a core network state is not established. In one aspect of the disclosure, there is an absence of a pre-established connection between the device and the network. For example, there is an absence of establishment of a (control plane) connection between the device and the network, that is, the network does not have an active context established for the device for service.

For Internet of Things (IoT) devices that send small data infrequently, current Third Generation Partnership (3GPP) system procedures impose unnecessary overhead in, for example, state management and signaling. Lengthy signaling procedures for attach, authentication, connectivity/session setup, etc. that may be warranted for other communications might not be warranted for transfer of small data messages.

It may be desirable to reduce state management and signaling overhead to, for example, reduce latency in data transfer related to transmission of small data messages.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

According to an implementation, the disclosure may provide a device that may include a communication interface and a processing circuit coupled to the communication interface, where the processing circuit may be configured to, for example, select a network through which the device is authorized to access a service associated with an entity, wherein the entity is associated with a set of security information and the set of security information is provisioned to the device by the entity. The processing circuit may be further configured to send the set of security information to a network node. The processing circuit may be further configured to obtain a random number in response to sending the set of security information if the device is successfully authorized to access the network. The processing circuit may be further configured to obtain a signature by signing a message, which includes the random number and data to be transferred, with a device private-key, wherein a device public-key is associated with the set of security information. As used herein, the term "a device private-key" is synonymous with the term "a private-key of the device." As used herein, the term "a device public-key" is synonymous with the term "a public-key of the device." The processing circuit may be still further configured to send the data and the signature to the network node to transfer the data via the network node in an absence of a pre-established connection to the network.

According to some aspects, the disclosure may provide a method of data transfer operational at a device. In some implementations, the method may include selecting a network through which the device is authorized to access a service associated with an entity, wherein the entity is associated with a set of security information and the set of security information is provisioned to the device by the entity. The method may further include sending the set of security information to a network node. The method may further include obtaining a random number in response to sending the set of security information if the device is successfully authorized to access the network. The method may still further include obtaining a signature by signing a message, which includes the random number and data to be transferred, with a device private-key, wherein a device public-key is associated with the set of security information. In some implementations, the method may still further include sending the data and the signature to the network node to transfer the data via the network node in an absence of a pre-established connection to the network.

In some aspects, the disclosure may provide a network node, including a communication interface and a processing circuit coupled to the communication interface. In some aspects the processing circuit may be configured to obtain, from a device, a set of security information, wherein an entity is associated with the set of security information and the set of security information is provisioned to the device by the entity. In some aspects, the processing circuit may be further configured to verify the set of security information, wherein the set of security information is associated with a device public-key. In some aspects, the processing circuit may be further configured to identify a data transfer destination associated with the entity. In some aspects, the processing circuit may be further configured to send a random number, in response to obtaining and verifying the set of security information, to signify that the device is authorized to access a network. In some aspects, the processing circuit may be further configured to obtain data and a signature from the device. In some aspects, the processing circuit may be further configured to verify the signature using a device public-key and a message including the random number and the data. In some aspects, the processing circuit may be still further configured to send the data to the data transfer destination associated with the entity via the network in an absence of a pre-established connection to the network.

According to some implementations, the disclosure may provide a method of data transfer operational at a network node. According to some implementations, the method may include obtaining, from a device, a set of security information wherein an entity is associated with the set of security information and the set of security information is provisioned to the device by the entity. The method may further include verifying the set of security information, wherein the set of security information is associated with a device public-key. The method may still further include identifying a data transfer destination associated with the entity. The method may still further include sending a random number, in response to obtaining and verifying the set of security information, to signify that the device is authorized to access a network. The method may still further include obtaining data and a signature from the device. The method may still further include verifying the signature using the device public-key and a message including the random number and the data, and sending the data to the data transfer destination associated with the entity via the network in an absence of a pre-established connection to the network.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
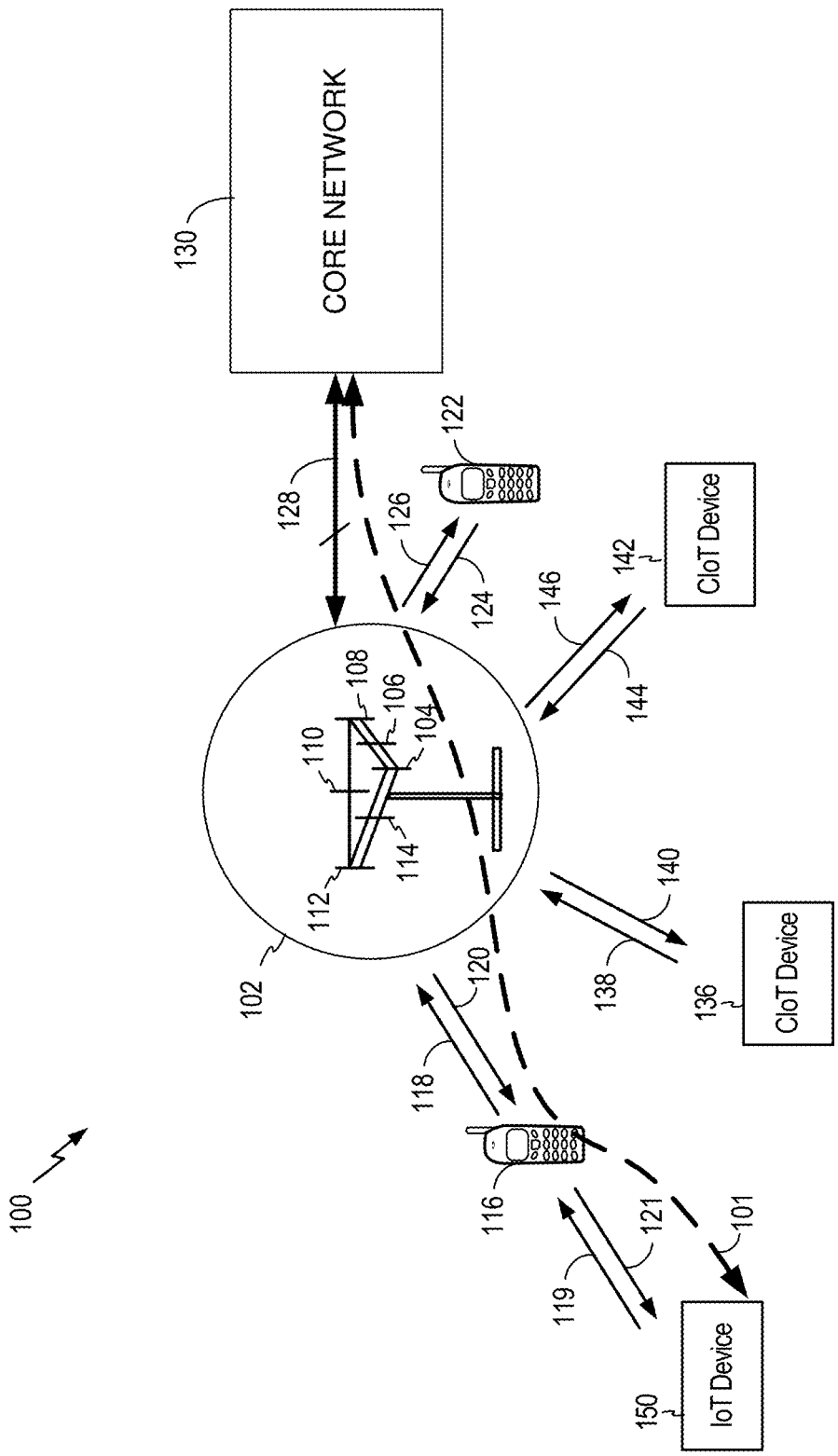
FIG. 1 is a diagram illustrating an example of a communication network within which aspects of the disclosure may find application.

By way of overview, connectionless data transfer is disclosed. Authentication of a device and network node may be performed when data is sent from the device to an application server of an application service provider via a selected network. The transfer of data may take place in an absence of an existing device context at the network through which the data travels. State management overhead and signaling overhead may be reduced by use of the exemplary aspects disclosed herein. For example, the device does not need to perform an authentication and key agreement (AKA) procedure to transfer the data and an existing (or pre-existing) device context need not be maintained at the network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Within this disclosure, the term "device public-key" may mean a public-key burnt into a device during manufacturing time, which cannot be changed or regenerated by the device; however, this is only one example of the public-key and the disclosure is not limited in scope to such an example. A device public-key may also include one generated by the device internally in a secure way. The device public-key generated by the device internally in a secure way may be used if it is verified and approved by an entity (e.g., an application service provider (ASP)). Also, within this disclosure, it will be understood that an entity (e.g., an ASP) may provision a public-key and private-key (PK-SK) pair to the device in a secure way. Accordingly, as used herein the term "device public-key" may mean "public-key associated with the device" without regard to how the device obtained the public-key. The same is true of a "device private-key" and "device certificate."

As stated above, lengthy signaling procedures for attach, authentication, connectivity/session setup, etc. that may be warranted for other communications might not be warranted for transfer of small data messages.

Examples of state management overhead may include overhead related to management of state (e.g., management of state-tables) in a Home Subscriber Server (HSS). This may include maintenance of permanent device credentials and subscription information. The HSS may also maintain state by maintaining temporary dynamic information (e.g., point of connection to nodes of a core network such as a packet data network PDN gateway (PDN GW) and/or a user-plane gateway (UP-GW)).

An additional example of state management overhead may include overhead related to management of state in a core network (CN). The CN may maintain a device context (e.g., security context and/or service context) for an entire lifetime of the device (e.g., a chip component, a cellular device, a wireless device, a mobile device, a user equipment (UE), a terminal) connectivity with the CN (e.g., an authentication session). Device context may be maintained, for example at a core network control-plane (CP-CN) node(s) and/or a core network user-plane (UP-CN) node(s).

An additional example of state management overhead may include overhead related to management of state in a radio access network (RAN). The RAN, according to current 3GPP system procedures, maintains a device context during a connected mode.

In addition to state management overhead, there may also be signaling overhead. For example, the following signaling events involve signaling between different network nodes:
Attach: RAN, CP-CN, HSS;
Service request: RAN, CP-CN, UP-CN;
Location update: RAN, CP-CN, HSS; and/or
Mobility: RAN, CP-CN, UP-CN.

IoT devices may include, but are not limited to, any piece of equipment with capabilities of communication and the optional capabilities of sensing, actuation, data capture, data storage, and/or data processing. A device (e.g., a chip component, a cellular device, a wireless device, a mobile device, a user equipment (UE), a terminal) may interface with an IoT device. The interface may be achieved directly (e.g., the IoT device may be integral to the device) or indirectly (e.g., the IoT device may interface to the device via a local area network). For ease of reference, it will be understood that any reference to a device made herein is a reference to a device interfaced to an IoT device (i.e., a CIoT device), unless otherwise specified. For ease of reference, it will be understood that any reference to a device made herein may be a reference to the device and/or an application operative (e.g., stored and able to operate, execute, run and/or operating, executing, running) on the device.

As used herein, the word "obtain" may mean derive, generate, compute, calculate, retrieve, receive, request, etc., and may encompass obtaining locally and/or obtaining remotely. As used herein, the word "obtain" may encompass partially obtaining and/or completely obtaining.

Overview

According to some aspects described herein, a device may transfer data via a network node (e.g., an access node or a core network node) to an application server associated with an entity (e.g., an application service provider) under a scenario where a core network state is not established and no signaling between the access node and a core network node is needed for the data transfer. Examples of an access node include a Cellular Internet of Things (CIoT) base station (C-BS), an Evolved Node B (eNodeB) and a gNB (a 5G base station). Examples of a core network node include a serving gateway, a packet data network gateway (P-GW), a core network control-plane (CP-CN) node (e.g., mobility management entity (MME), access and mobility management function (AMF), session management function (SMF)), a core network user-plane (UP-CN) node (e.g., user-plane function (UPF)), and a CIoT Serving Gateway Node (C-SGN).

In some implementations, the device may select a network (e.g., from a list of networks) through which the device is authorized to access a service associated with the entity. The entity may be associated with a set of security information (e.g., a certificate including a device public-key, where the certificate is signed by the entity, a device ID, a raw device public-key, or a device public-key identifier). As used herein, the term "a device private-key" is synonymous with the term "a private-key of the device." As used herein, the term "a device public-key" is synonymous with the term "a public-key of the device." The set of security information may include one item, or one piece, of information; for example, the set of security information may include only the certificate signed by the entity. The set of security information may be provisioned to the device by the entity. In one aspect, the device can send a request for connectionless data transfer to the network node. In one example, the connectionless data transfer may be implemented using the set of security information and, if the network node supports data transfer using the set of security information, the set of security information (e.g., a certificate signed by the entity) can be sent to the network node from the device. The network node can provide a random number, in response to the device sending the set of security information. The random number can be obtained if the device is successfully authorized to access the network (e.g., authorized to access a service associated with the network (e.g., a transport service)). The device can generate a signature by signing a message, which includes the random number and the data to be transferred. The message can be signed with a device private-key, where the device public-key is associated with the set of security information. For example, when the set of security information is the certificate, the certificate may include a copy of the device public-key. The device can then send the data and the signature to the network node to transfer the data via the network node in an absence of a pre-established connection to the network. In one aspect, the data can be transferred to the entity (i.e., the application server associated with the entity) and/or another entity authorized by the entity.

According to some other aspects, a device may be authenticated, and have a context established, by an access node using a public-key credential, and the context can be removed from the access node so that a core network state is not established and no signaling between the access node and a core network node is needed for the data transfer. In some implementations, the device may select a network (e.g., from a list of networks) through which the device is authorized to access a service associated with an entity (e.g., an entity such as an application service provider (ASP) that is to be the recipient of data sent through the network to an application server associated with the ASP). The device can send a request for mutual authentication to an access node, the request including a certificate signed by the entity. The device can perform mutual authentication with the access node and may obtain a session master key, wherein the session master key is obtained if the device is authenticated to the network and authorized to access a service associated with the network. The service may be, for example, a transport service. The device can then obtain (e.g., calculate) a user-plane key (K_UP) using the session master key. The device can also obtain (e.g., receive) a context cookie from the access node, wherein the context cookie is based on a device context generated by the access node and not maintained in a state-table of the access node. The device may subsequently protect a packet data unit (PDU) using the K_UP, and send the protected PDU with the context cookie to the access node in an absence of a pre-established connection to the network.

Exemplary corresponding processes are described herein in connection with the exemplary access nodes.

Exemplary Operating Environment

FIG. 1 is a diagram illustrating an example of a communication network 100 within which aspects of the disclosure may find application. According to aspects described herein, a device (e.g., an IoT device 150, a CIoT device 136, 142, a cellular device 122) may transfer data via a network node (e.g., a radio access network node 102) to an application server (not shown) associated with an entity (e.g., an application service provider) under a scenario where a core network state is not established and no signaling between the device 150 and a core network 130 is needed for the data transfer. In the example of FIG. 1, the dashed line 101 represents a connectionless data transfer between a device (e.g., IoT device 150) and the core network 130. Accordingly, aspects described herein may enable a device (e.g., an IoT device 150, a CIoT device 136, 142, a cellular device 122) to communicate with a service without being registered to a core network 130. Aspects described herein may reduce signaling and state management overhead by using a stateless mechanism for device authentication and authorization to access a service of the network (e.g., a transport service to transport the data to its destination). Aspects described herein may leverage public-key based authentication. Aspects described herein may use leveraged public-key based authentication for device authentication for network access and/or data authentication.

A radio access network (RAN) (referred to as a RAN node 102) may include one or more access nodes (e.g., Cellular Internet of Things (CIoT) base station (C-BS), Evolved Node B (eNodeB), a RAN node). In the example of FIG. 1, a RAN node 102 may include multiple antenna groups, one group including antennas 104 and 106, another group including antennas 108 and 110, and an additional group including antennas 112 and 114. In FIG. 1, two antennas are shown for each antenna group; however, more or fewer antennas may be utilized for each antenna group.

A cellular device 116 may be in communication with the antennas 112 and 114, where the antennas 112 and 114 transmit information to the cellular device 116 over a forward link 120 (e.g., downlink) and receive information from the cellular device 116 over a reverse link 118 (e.g., uplink). A cellular device 122 may be in communication with the antennas 104 and 106, where the antennas 104 and 106 transmit information to the cellular device 122 over a forward link 126 and receive information from the cellular device 122 over a reverse link 124. The RAN node 102 may also be in communication with other cellular devices, which may, for example, interface with Internet of Things (IoT) devices. For example, an IoT device 150 may be in communication with the cellular device 116, wherein information may be transmitted to the IoT device 150 over a forward link 121 and information may be sent from the IoT device 150 to the cellular device 116 over a reverse link 119. A cellular device interfaced (e.g., directly or indirectly) to an IoT device (collectively referred to as a Cellular Internet of Things (CIoT) device or CIoT device 136) may be in communication with one or more other antennas of the RAN node 102. The one or more other antennas of the RAN node 102 may transmit information to the CIoT device 136 over a forward link 140 and receive information from the CIoT device 136 over a reverse link 138. A CIoT device 142 may be in communication with one or more other antennas of the RAN node 102, where the antennas transmit information to the CIoT device 142 over a forward link 146 and receive information from the CIoT device 142 over a reverse link 144. The RAN node 102 may be coupled to a core network 130 by one or more communication links and/or reference points 128.

The various concepts presented throughout this disclosure may be implemented across a broad variety of telecommunication systems, network architectures, and communication standards. For example, the Third Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Evolution of the LTE network is an ongoing process. The evolution includes changes/modifications/alternatives made for improved interoperability with all cellular devices, including cellular devices interfaced to IoT devices. Accordingly, examples of changes/modifications/alternatives to devices 116, 122, 150, 136, 142, the RAN node 102, and nodes within the core network 130 are described herein.

IoT devices may operate by sending periodic reports throughout a day; they do not remain connected to the network for long stretches of time. Many IoT devices are stationary, they do not move through cells, rather they remain in a fixed location within the borders of one cell. Other IoT devices, such as those coupled to automobiles, human beings, parcels, etc. move through cells, that is, they roam. As IoT devices roam through a network, when a time comes for them to send a report, they wake up in a cell and send their report from within that cell; cell-to-cell connected mode mobility might not be required.

Therefore, cell-to-cell connected mode mobility might not be supported in the CIoT architecture. Elimination of mobility management provides a reduction in overhead for both the radio access network (RAN) node (e.g., eNodeB) in the RAN and the control-plane function (e.g., MME) in the core network. Accordingly, the CIoT architecture introduces a new node referred to as a CIoT Serving Gateway Node (C-SGN). The C-SGN combines any needed functionality remaining from an MME with the functionality of a Serving-Gateway (S-GW). The C-SGN may be equivalent to a Serving General Packet Radio Service (GPRS) Support Node (SGSN) in 3G.

Figure 2:
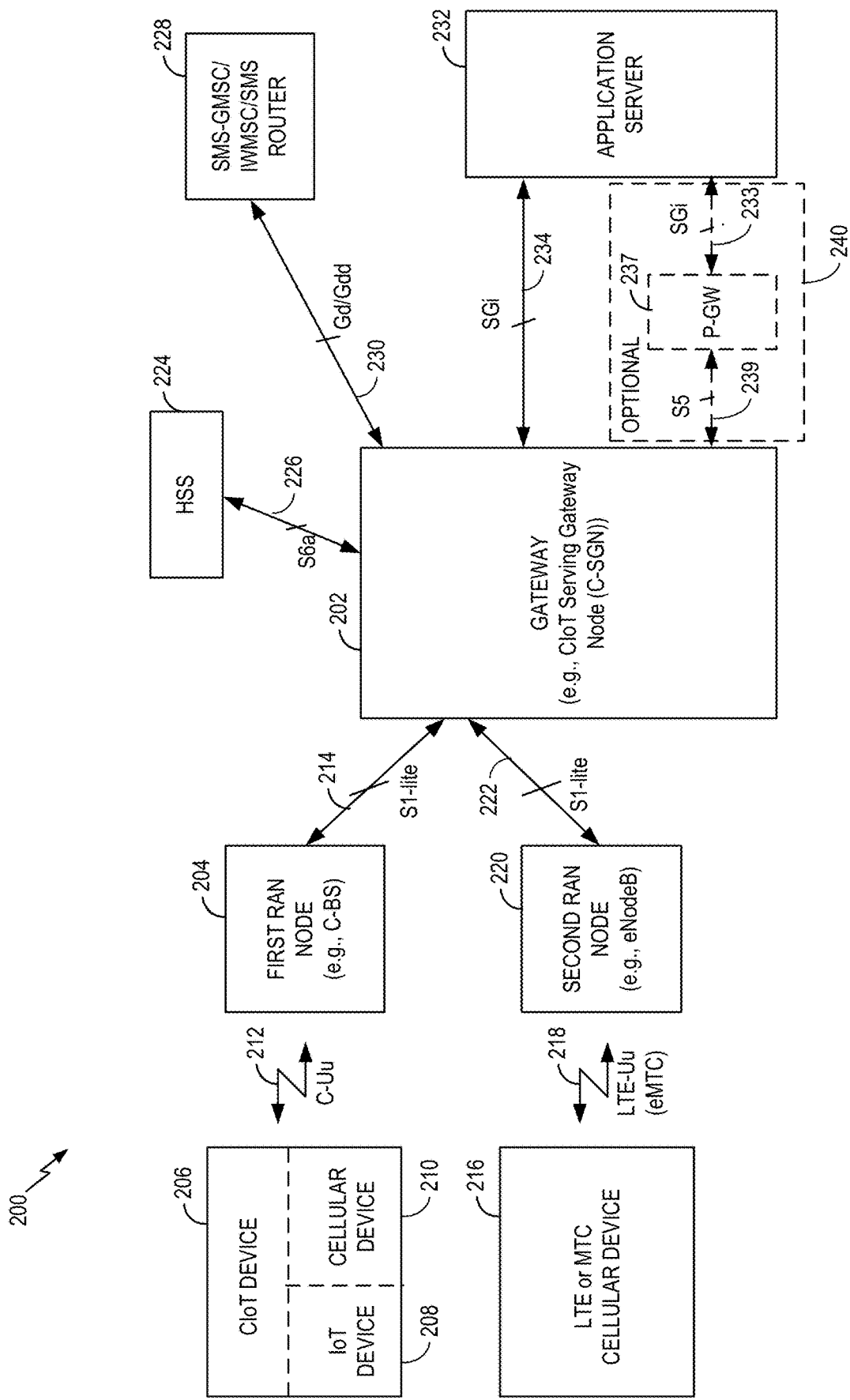
FIG. 2 is a diagram illustrating another example of a communication network within which aspects of the disclosure may find application.

FIG. 2 is a diagram illustrating another example of a communication network 200 within which aspects of the disclosure may find application. The exemplary illustration of FIG. 2 is representative of a CIoT architecture for a non-roaming scenario involving a CIoT device 206. In the aspect of FIG. 2, the functions of a packet data network gateway (P-GW) can be integrated with that of the gateway 202 (e.g., C-SGN). Additionally or alternatively, as an implementation option 240, the functions of the P-GW can be separated from the gateway 202 in P-GW 237. According to the implementation option 240, an S5 reference point 239 may be used between the gateway 202 (e.g., C-SGN) and the P-GW 237. The S5 reference point may provide user-plane tunneling and tunnel management between the gateway 202 (e.g., C-SGN) and the P-GW 237. The S5 reference point may be used, for example, if the gateway 202 (e.g., C-SGN) connects to a non-collocated P-GW 237 for packet data network connectivity. Thus, even in the exemplary non-roaming scenario of FIG. 2, the gateway 202 (e.g., C-SGN) and the P-GW 237 may optionally be separate entities (e.g., they might not be collocated). The application server 232 may communicate with the P-GW 237 over an SGi 233 reference point.

In the example of FIG. 2, the CIoT device 206 may be represented as an IoT device 208 interfaced to a cellular device 210. The interface may be direct (e.g., the IoT device 208 may be hardwired to the cellular device 210) or indirect (e.g., the IoT device 208 may be coupled to the cellular device 210 via an intermediate communication network, such as a Bluetooth wireless network). The CIoT device 206 may wirelessly communicate with the first RAN node 204 (e.g., C-BS) over a C-Uu reference point 212 (reference points may also be referred to as network interfaces). The first RAN node 204 (e.g., C-BS) may communicate with the gateway 202 (e.g., C-SGN) over an S1, or equivalent, reference point. In some aspects, as illustrated in FIG. 2, the first RAN node 204 may communicate with the gateway 202 over an S1-lite 214 reference point. S1-lite is a "lightweight" version of S1 that is optimized for small data messages. For example, only the S1 application protocol (S1AP) messages and information elements (IEs) needed to support CIoT procedures may be included in S1-lite. In general, the reference point (e.g., network interface) may be S1, S1-lite 214, or an equivalent.

Also depicted in FIG. 2 is a Long Term Evolution (LTE) or Machine Type Communication (MTC) cellular device 216. The LTE or MTC cellular device 216 may wirelessly communicate with a second RAN node 220 (e.g., eNodeB) over an LTE Uu (eMTC) reference point 218.

The second RAN node 220 may communicate with the gateway 202 over an S1 reference point. In some aspects, as illustrated in FIG. 2, the second RAN node 220 may communicate with the gateway 202 over an S1-lite 222 reference point.

The gateway 202 may communicate with a home subscriber server 224 (HSS). The HSS 224 may, among other things, store and update a database containing user subscription information and generate security information from user identity keys. The HSS 224 may communicate with the gateway 202 over an S6a 226 reference point. The S6a 226 reference point enables transfer of subscription and authentication data for authenticating/authorizing user access to the communication network 200. The gateway 202 may communicate with a short message service (SMS) gateway mobile switching center (SMS-GMSC)/Inter Working Mobile Switching Center (IWMSC)/SMS router (i.e., an SMS-GMSC/IWMSC/SMS router 228). In general, the SMS-GMSC/IWMSC/SMS router 228 is a point of contact for short message service with other networks. The SMS-GMSC/IWMSC/SMS router 228 may communicate with the gateway 202 over a Gd/Gdd 230 reference point.

The gateway 202 may communicate with an application server 232. In general, the application server 232 may host applications of service providers. The application server 232 may be located in, or interfaced with, a packet data network (e.g., the Internet). The application server 232 may communicate with the gateway 202 over an SGi 234 reference point. The SGi 234 is a reference point between the gateway 202 (e.g., C-SGN) and the packet data network.

Figure 3:
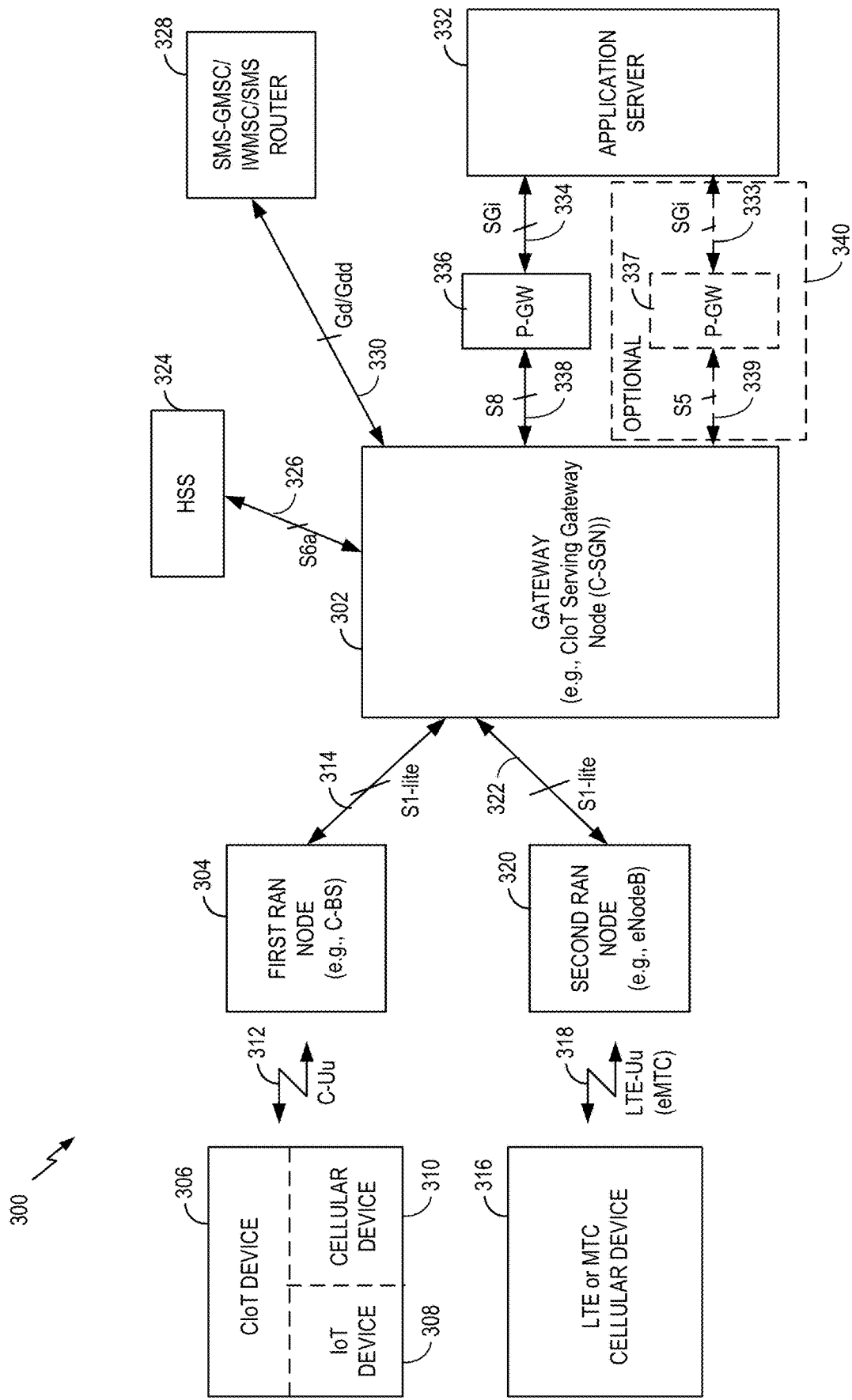
FIG. 3 is a diagram illustrating still another example of a communication network within which aspects of the disclosure may find application.

FIG. 3 is a diagram illustrating still another example of a communication network 300 within which aspects of the disclosure may find application. The exemplary illustration of FIG. 3 is representative of a CIoT architecture for a roaming scenario involving a CIoT device 306.

The nodes of FIG. 3 are the same or similar to those of FIG. 2, with the exception of the addition of a packet data network (PDN) gateway (P-GW) 336 node external to, and/or not collocated with, the gateway 302 (e.g., C-SGN). The description of FIG. 3 follows for the sake of completeness.

In the example of FIG. 3, a CIoT device 306 may be represented as an IoT device 308 interfaced to a cellular device 310. The interface may be direct (e.g., the IoT device 308 may be hardwired to the cellular device 310) or indirect (e.g., the IoT device 308 may be coupled to the cellular device 310 via an intermediate communication network, such as a Bluetooth wireless network). The CIoT device 306 may wirelessly communicate with the first RAN node 304 (e.g., C-BS) over a C-Uu reference point 312 (reference points may also be referred to as network interfaces). The first RAN node 304 (e.g., C-BS) may communicate with the gateway 302 (e.g., C-SGN) over an S1 reference point. In some aspects, as illustrated in FIG. 3, the first RAN node 304 may communicate with the gateway 302 over an S1-lite 314 reference point. S1-lite is a version of S1 that is optimized for small data messages. For example, only the S1 application protocol (S1AP) messages and information elements (IEs) needed to support CIoT procedures may be included in S1-lite. In general, the reference point (e.g., network interface) may be S1, S1-lite 314, or an equivalent.

Also depicted in FIG. 3 is a Long Term Evolution (LTE) or Machine Type Communication (MTC) cellular device 316. The LTE or MTC cellular device 316 may wirelessly communicate with a second RAN node 320 (e.g., eNodeB) over an LTE Uu (eMTC) reference point 318.

The second RAN node 320 may communicate with the gateway 302 over an S1 reference point. In some aspects, as illustrated in FIG. 3, the second RAN node 320 may communicate with the gateway 302 over an S1-lite 322 reference point.

The gateway 302 may communicate with a home subscriber server 324 (HSS). The HSS 324 may store and update a database containing user subscription information and generates security information from user identity keys. The HSS 324 may communicate with the gateway 302 over an S6a 326 reference point. The S6a 326 reference point enables transfer of subscription and authentication data for authenticating/authorizing user access to the communication network 300. The gateway 302 may communicate with a short message service (SMS) gateway mobile switching center (SMS-GMSC)/Inter Working Mobile Switching Center (IWMSC)/SMS router (i.e., an SMS-GMSC/IWMSC/SMS router 328). In general, the SMS-GMSC/IWMSC/SMS router 328 is a point of contact for short message service with other networks. The SMS-GMSC/IWMSC/SMS router 328 may communicate with the gateway 302 over a Gd/Gdd 330 reference point.

The gateway 302 may communicate with an application server 332. In general, the application server 332 may host applications of service providers. The application server 332 may be located in, or interfaced with, a packet data network (e.g., the Internet). The application server 332 may communicate with the P-GW 336 over an SGi 334 reference point. The SGi 334 is the reference point between the P-GW 336 and the application server 332 in the packet data network. The P-GW 336 may communicate with the gateway 302 (e.g., the C-SGN) over an S8 338 reference point. The S8 338 reference point is an inter-Public Land Mobile Network (inter-PLMN) reference point, which generally provides user-plane and control-plane interface between a Serving GW (or in the case of FIG. 3, a C-SGN) in a Visitor Public Land Mobile Network (VPLMN) and a P-GW in a Home Public Land Mobile Network (HPLMN).

In the aspect of FIG. 3, the P-GW functions can be separated from the gateway 302 in P-GW 336 or, as an implementation option 340, in P-GW 337. In the case of implementation option 340, an S5 reference point 339 may be used between the gateway 302 (e.g., C-SGN) and P-GW 337. The S5 reference point may provide user-plane tunneling and tunnel management between the gateway 302 (e.g., C-SGN) and the P-GW 337. The S5 reference point may be used, for example, if the gateway 302 (e.g., C-SGN) connects to a non-collocated P-GW 337 for packet data network connectivity. The application server 332 may communicate with the P-GW 337 over an SGi 334 reference point. The SGi 334 is the reference point between the P-GW 337 and the application server 332 in the packet data network. The application server 332 may communicate with the P-GW 337 over an SGi 333 reference point.

In the exemplary aspects described herein, the cellular device may be interfaced to an Internet of Things (IoT) device. Some exemplary aspects may be described in relation to data messages (e.g., small data messages) sent between the IoT device and an application server; however, the aspects described herein are not limited to these examples and are not limited to small data messages.

Figure 4:
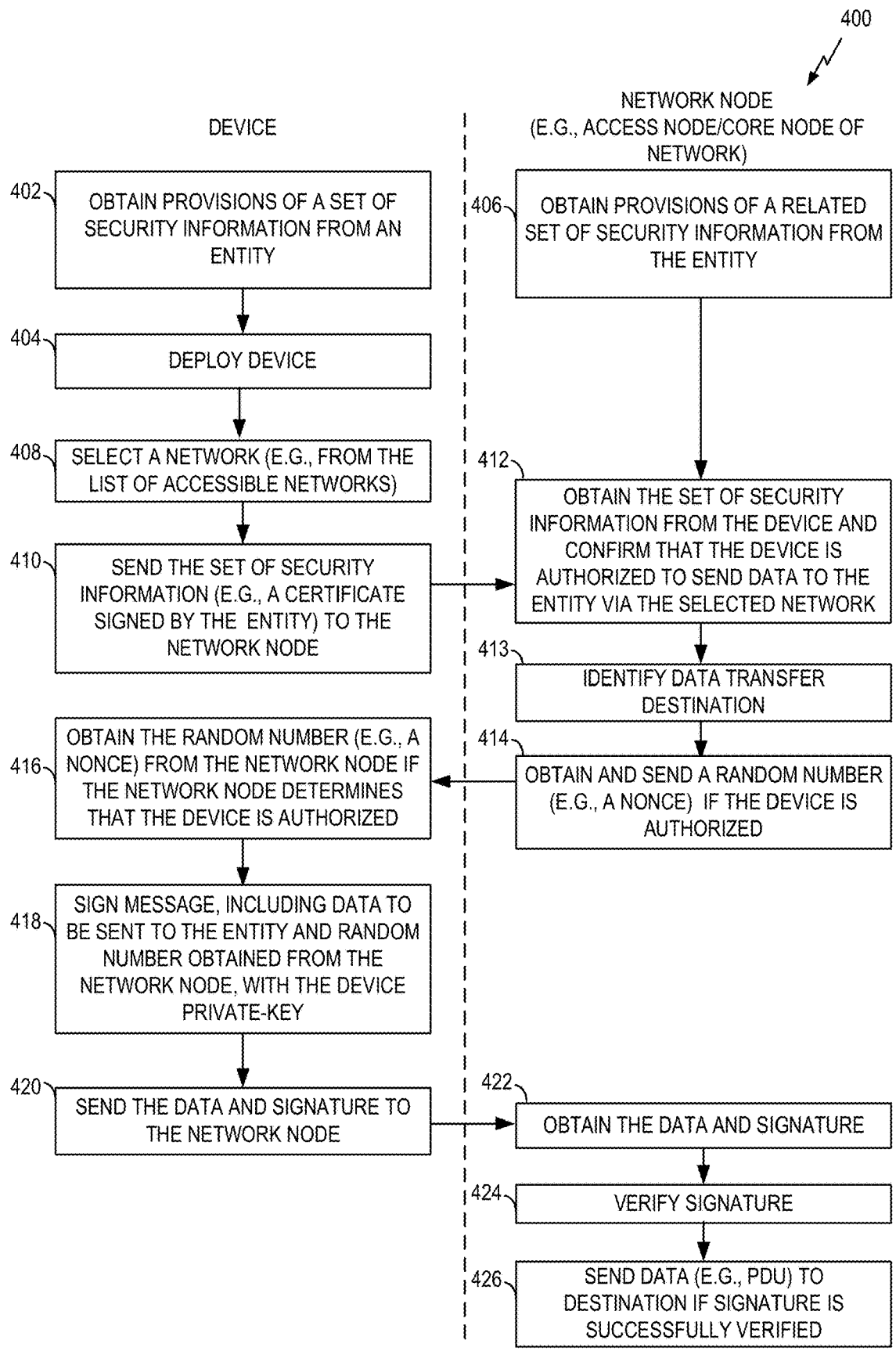
FIG. 4 is a flow diagram providing an overview of an exemplary method of connectionless data transfer from a perspective of a device, in accordance with aspects of the disclosure.

Exemplary Connectionless Data Transfer in Scenarios where a Core Network State is not Established FIG. 4 is a flow diagram providing an overview of an exemplary method 400 of connectionless data transfer illustrating one possible option from the perspectives of a device and a network node (e.g., access node/core network node) interacting with the device, in accordance with aspects of the disclosure.

Aspects described herein may occur in an absence of a pre-established connection between the device and the network. For example, the existence of a pre-established connection between the device and the network may mean that a device context for a communication session with the device exists at the core network. As another example, the existence of a pre-established connection between the device and the network may mean that data transfer occurs in the presence of control-plane signaling between the device and the core network. As still another example, the existence of a pre-established connection between the device and the network may mean that the device is attached (e.g., registered) to the network prior to sending data to a network node. As another example, the existence of a pre-established connection between the device and the network may mean that the device is registered to the network prior to sending data to a network node. Thus, in the absence of a pre-established connection between the device and the network, there may be at least one of: no existing device context for a communication session with the device at the core network, no control-plane signaling during data transfer between the device and the core network, no attachment of the device to the network prior to the device sending data to the network node, or no registration of the device to the network prior to the device sending data to the network node. Broadly speaking, and by way of example, within this disclosure, the term "connectionless" may mean that there is no control-plane connection between the device and the network and more precisely may mean that the network does not have any active context established for the device for service.

In the example of FIG. 4, a core network state of a device is not established (e.g., a device context for a communication session with the device does not exist at the core network; signaling between the network node interacting with the device and the core network (not shown) is not needed). That is, a pre-established connection between the device and the network does not exist.

The device may obtain provisions of a set of security information 402 related to connectionless data transfer, including, for example, a device identifier, a pair of device public-private keys, a certificate, a certificate signed by an entity to which data is to be transferred/sent/exchanged, a raw device public-key, a device public-key identifier (ID), and a list of accessible networks. The device may use the list of accessible networks to select a network through which the device is authorized to access a service associated with an entity. The entity may be associated with the set of security information provisioned to the device. The entity may provision the set of security information to the device.

For exemplary purposes, the entity may be an application service provider (ASP) and the device may be an Internet of Things (IoT) device that is directly and/or indirectly associated with a wireless communication device. The direct and/or indirect association between the IoT device and wireless communication device permits the IoT device (or application) to wirelessly communicate with an application server (AS) of the ASP (e.g., an AS hosting an application of the ASP). The application server may be, for example, the application servers 232, 332 as depicted in either of FIGS. 2 and 3 herein. The IoT device and wireless communication device may be, for example, the CIoT devices 206, 306 as depicted in either of FIG. 2 or 3 herein. The composite of the IoT device and the wireless communication device may be referred to as "the device" for expediency. Also, for expediency, reference to the device may be a reference to the device or an application of the device. Examples of the device may include an electric utility meter, a home scale, a refrigerator, and an alarm system controller.

The device may be deployed 404. For example, the ASP may deploy the device.

The network node may obtain provisions of a related set of security information 406, for example, for authenticating and for authorizing the device or more generally for connectionless data transfer. The relationship between the set of security information provisioned by the entity to the device and the related set of security information provisioned by the entity to the network node might not be one-to-one. According to one example, the relationship between the set of security information provisioned by the entity to the device and the related set of security information provisioned by the entity to the network node is not one-to-one; however, the network node can identify the security information provisioned to the device because the set of security information provisioned by the entity to the device and the related set of security information provisioned by the entity to the network node are associated. For example, the network node may obtain a device ID, a raw device public-key, and/or a device public-key ID. The network node may obtain these from the entity (e.g., an ASP) or from a repository that the entity provisioned. The network node may also obtain, for example, a public-private key pair, denoted by $PK_{Net}$, $SK_{Net}$.

The network node may be provisioned by an ASP (e.g., an entity) so that the network node can authenticate and/or authorize devices associated with the ASP. The provisions of information may include the ASP certificate that includes an ASP public-key in accordance with aspects of the disclosure. The ASP public-key may be used to verify the certificate of the device signed by the ASP (e.g., a certificate issued by the ASP that includes the device public-key, where the certificate is signed by the ASP). In general, the ASP public-key (e.g., the public-key of the entity associated with the set of security information provisioned to the device by the entity) may be used to verify the set of security information. The set of security information may be associated with the device public-key. The provisions of information may include information about how/where to forward/process a received packet data unit (PDU) in accordance with aspects of the disclosure. The related set of security information 406 may include a certificate signed by a mobile network operator (MNO) (the MNO has a public-private key pair denoted by $PK_{MNO}$, $SK_{MNO}$). The certificate signed by the MNO may be used, for example, to authenticate the network node to the device. Authenticating the network node to the device is optional and is not depicted in FIG. 4.

According to some aspects, the network node may be provisioned with a list of device identifiers (device IDs) and associated device public-keys. For example, an entity (an ASP that has authority to exchange data with the device) may provision the network node or a public-key repository with raw device public-keys, the device IDs and associated device public-keys, and/or device public-key identifiers (PK IDs). This may eliminate a need for certificate management (e.g., issue, revocation) and over-the-air certificate delivery overhead with the device at the expense of maintaining a public-key repository.

The device may select a network, for example from the list of accessible networks 408. That is, the device may select a network through which the device is authorized to access a service associated with an entity, wherein the entity is associated with a set of security information and the set of security information is provisioned to the device by the entity.

The device may send the set of security information to the network node 410. For example, the set of security information may be a certificate. The certificate may include the device public-key. The certificate may be signed by the entity.

The network node may obtain the set of security information and use the set of security information to confirm that the device is authorized to send data, to the entity that provisioned the set of security information to the device, via the selected network 412. Authentication of the device is not required for data transfer in a connectionless data transfer application. However, according to one aspect, the network node may authenticate the device based on the authentication or verification of the data the device has sent.

The network node may identify a data transfer destination associated with the entity 413.

The network node may use the set of security information (e.g., the certificate signed by the entity) to confirm that the device is authorized to send data to a data transfer destination (e.g., an application server) via the selected network. The data transfer destination may be identified in the certificate or obtained via a cross-reference to other materials accessible to the network node. The data transfer destination may be, for example, an application server of the entity (e.g., of the ASP) or another destination authorized by the entity.

As used herein, a network node may be a node that interacts with the device and through which the device may gain access to the core network. The network node may be external to the core network or may be internal to the core network. According to one aspect, the network node interacting with the device may be a node of an access network, for example, a node of a RAN (e.g., an eNodeB) or an access point of a Wireless Local Area Network (Wireless LAN). The node of the access network may be referred to generally herein as a RAN or an access network (AN). According to another aspect, the network node interacting with the device may be a node in a core network. The node in the core network does not necessarily implement a dedicated control-plane function. According to this aspect, the network node in the core network may be referred to herein as "a core network node".

The network node may obtain (e.g., derive, generate) a random number (e.g., a nonce) and send the random number to the device 414, if the device is successfully authorized to access the network (e.g., successfully authorized to send data to the entity via the selected network).

The device may obtain the random number (e.g., the nonce) from the network node if the network node determines that the device is authorized 416 to access the network.

The device may sign a message (and thereby obtain a signature), including the random number and the data (e.g., a PDU) intended for transfer to the application server (AS) of the entity (e.g., the ASP), with the device private-key 418. The signature may be obtained (e.g., derived, generated) based, for example, on a hash of the random number obtained from the network node and the data to be sent to the entity (e.g., the ASP). The device may then send the data (e.g., the PDU) and the signature to the network node 420.

In some aspects, the device may send the data and the signature to the network node to transfer the data via the network node in an absence of a pre-established connection to the network. In other words, when the device sends the data and the signature to the network node, there may be no device context established for a communication session with the device at the network.

In accordance with aspects described herein, when the set of security information comprises the certificate signed by the entity, the signature sent with the data is associated with the certificate sent to the network node from the device. In other words, the signature, obtained using the device private-key, is associated with the certificate sent to the network node from the device at least because the certificate included the device public-key.

The network node may obtain the data and the signature (of the device) 422. The network node may verify the signature (of the device) 424. If the set of security information was the certificate signed by the entity, the network node may verify the signature (of the device) using a device public-key included in the certificate. If the set of security information was raw device public-key, the network node may verify the signature (of the device) using the raw device public-key. If the set of security information was a device ID associated with the device public-key, or a device public-key ID, the network node may obtain the associated public-key from the security information provisioned to itself by the entity (or from a public-key repository) and verify the signature (of the device) using the obtained public-key. If the signature (of the device) is successfully verified, the network node may send the data (e.g., the PDU) to a data transfer destination via the selected network 426. The data transfer destination may be, for example, an application server associated with the entity. The data may be sent in an absence of a pre-established connection to the network. In other words, network node may send the data to the data transfer destination associated with the entity via the network in an absence of a pre-established connection to the network. In still other words, and by way of example, when the network node is an access node, the network node may implement connectionless data transfer in an absence of establishment of a connection between the access node and a user-plane gateway in a core network.

According to the exemplary aspect of FIG. 4, connectionless data transfer with the network node may be performed when data (e.g., the PDU) needs to be sent from the device to an application server of an ASP via a network. The transfer of data (e.g., the PDU) may take place in an absence of an existing context (or connection) established between the device and the network node (e.g. a RAN node, or a core network node) through which the data travels, hence the term connectionless data transfer. State management overhead and signaling overhead may be reduced by use of the exemplary aspect of FIG. 4. For example, the device does not need to perform an authentication and key agreement (AKA) procedure to transfer the PDU, and an existing (or pre-existing) device context need not be maintained at the core network.

Figure 5:
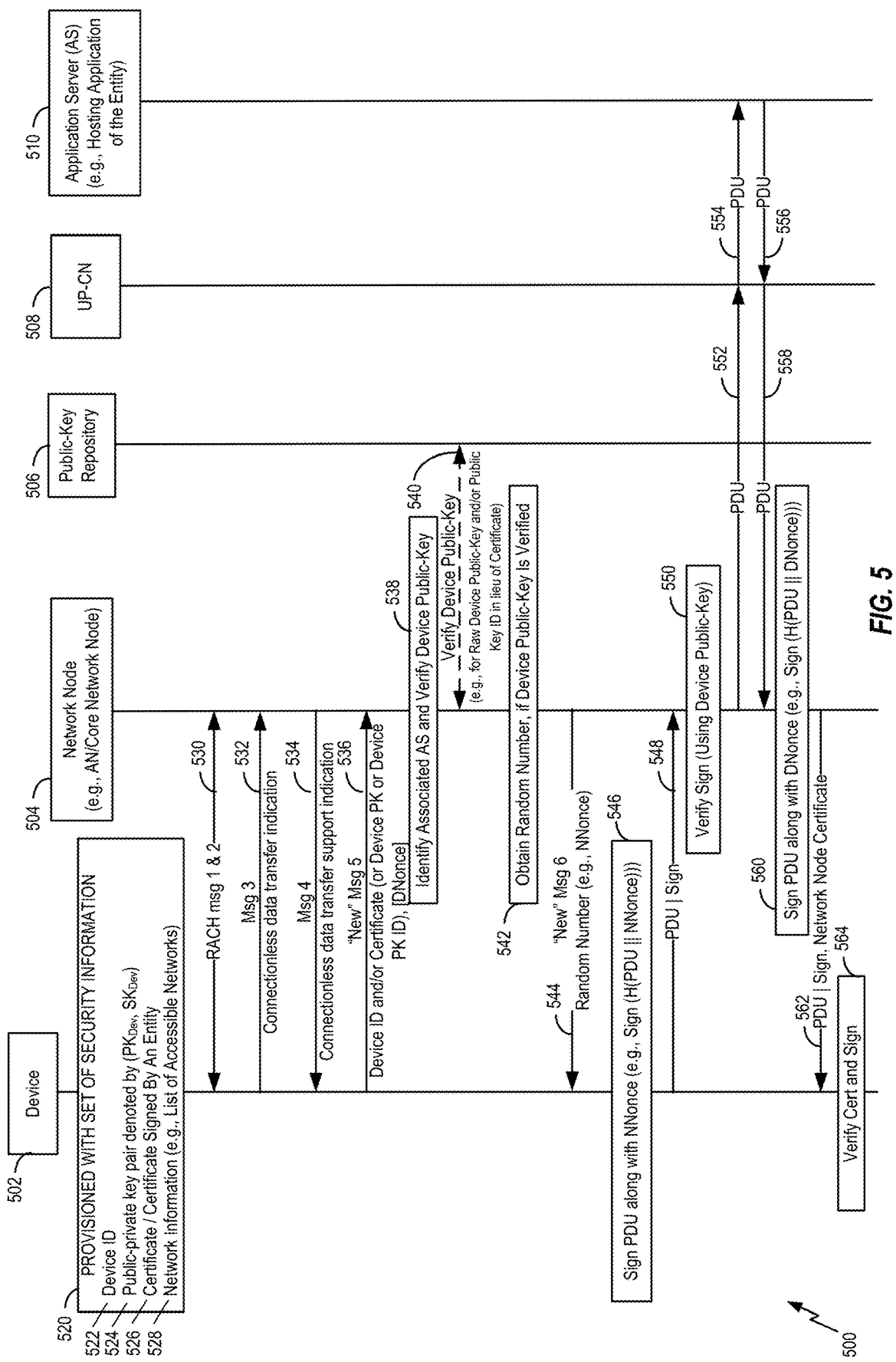
FIG. 5 is a call flow diagram illustrating an example of connectionless data transfer, in accordance with aspects of the disclosure.

FIG. 5 is a call flow diagram 500 illustrating an example of connectionless data transfer, in accordance with aspects of the disclosure. The exemplary call flow diagram 500 of FIG. 5 may be representative of a scenario where a core network state is not established and no signaling between an access node (e.g., Cellular Internet of Things (CIoT) base station (C-BS), Evolved Node B (eNodeB)) and a core network node is needed for data transfer. In the exemplary call flow diagram 500 of FIG. 5, there is included a device 502 (e.g., a wireless device, a cellular device, a UE, a CIoT device), a network node (e.g., an access network (AN) node or core network node) referred to herein as network node 504, a public-key repository node 506, a core network user-plane node 508 (referred to herein as a UP-CN node) (e.g., a Packet Data Network (PDN) gateway or P-GW), and an application server node (referred to herein as AS 510).

The exemplary call flow of FIG. 5 may begin with provisioning of a set of security information 520 (e.g., one or more of a device identifier, a public-private key pair, a certificate/certificate signed by an entity, a device public-key identifier (PK ID), and/or a list of accessible networks) to the device 502. In one aspect, the device 502 may be deployed after provisioning.

The device 502 may be provisioned with a device identifier that uniquely identifies the device (hereinafter referred to as device ID 522). According to one aspect, the device ID may be a hash of the device public-key.

The device 502 may be provisioned with a public-private key pair denoted by ($PK_{Dev}$, $SK_{Dev}$) 524. The device private-key ($SK_{Dev}$) may be held in a secure storage of the device. By way of example, the device public-key ($PK_{Dev}$) and the device private-key ($SK_{Dev}$) may be provisioned by a provisioning entity. Examples of a provisioning entity may include a mobile network operator (MNO), a service provider, and/or a content provider.

The device 502 may be provisioned with a certificate or a certificate that may be signed by an entity 526. The certificate or certificate signed by the entity may include the device public-key. Alternatives to the certificate signed by the entity include the device ID, a raw device public-key, or a device public-key identifier. The entity may provide services (e.g., electric power delivery monitored by an electric power meter, health monitoring, news delivery) to the device 502 or collect data (e.g., electric power meter data, health data, home/building security) from the device 502. Examples of the device 502 may include sensor devices. Examples of sensor devices may include power meters, wearable health monitors (e.g., for blood pressure, heart rate, motion monitoring, and monitors for other physiological parameters), weight scales, still/video cameras, security monitors (e.g., such as building entry detectors, fire/smoke/water detectors), appliance monitors (e.g., such as refrigerator/freezer monitors), sound monitors/microphones/speakers (e.g., such as for interactive audio exchanges with a local or remote information service provider).

According to one aspect, the entity may be an Application Service Provider (ASP). The entity may be the provisioning entity or a different entity. The entity may have an entity public-private key pair. According to the exemplary aspect where the entity is an ASP, the ASP may have an ASP public-key ($PK_{AS}$) and an ASP private-key ($SK_{AS}$). As appreciated by those of skill in the art, the certificate may include diverse data, which may include the device public-key ($PK_{Dev}$). The certificate may signed using the entity private-key. According to the exemplary aspect where the entity is the ASP, the certificate may signed using the ASP private-key ($SK_{AS}$). Accordingly, the certificate signed by the entity may be a certificate including the device public-key ($PK_{Dev}$) signed using the ASP private-key ($SK_{AS}$). According to one aspect, the certificate signed by the entity may include only the device public-key ($PK_{Dev}$).

A first alternative to the certificate may be a device public-key ($PK_{Dev}$) itself (e.g., without additional data). This may be referred to as a raw public-key (e.g., a raw device public-key). According to the first alternative, the certificate signed using the entity private-key may be replaced by a raw device public-key. The device public-key may be provisioned at the network by the ASP associated with the device public-key (i.e., the ASP provisions the device public-key to the network) so that the device public-key can be verified by the network when the device public-key is presented to the network by the device.

A second alternative to the certificate may be a public-key identifier (PK ID). A PK ID may an identifier used to uniquely identify a public-key such as the device public-key. By using a PK ID, the public-key (which is identified by the PK ID) does not need to be included in a message. This reduces the message size overhead. In many aspects, this reduces the message size overhead substantially as device public-keys can be lengthy. According to the second alternative, the certificate signed using the entity private-key may be replaced by the device public-key identifier (device PK ID) and the device public-key identifier and the corresponding device public-key is provisioned at the network by the ASP associated with the device public-key (i.e., the ASP provisions device PK ID and the device public-key to the network) so that the device public-key can be verified by the network when the device PK ID is presented by the device to the network.

A third alternative to the certificate may be a device ID. According to the third alternative, the certificate signed using the entity private-key may be replaced by the device ID. The device ID is provisioned at the network by the ASP associated with the device (i.e., the ASP provisions the device ID to the network) so that the device ID can be verified by the network when the device ID is presented to the network by the device. The device ID may be associated with the device public-key. In one implementation, the device ID may be a hash of the device public-key.

The device may also be provisioned with network information 528. The network information may include identification of a set of networks. The networks in the set of networks may be identified using respective network identifiers (e.g., public land mobile network identifiers (PLMN IDs) or a service set identifiers (SSIDs)). The networks identified in the set of networks may include those networks through which the device 502 can access the ASP services (e.g., networks through which the device 502 can send/obtain (e.g., transfer, transmit, receive) data to/from an application server (AS) (e.g., AS 510) hosting the ASP services) using connectionless data transfer as described herein. Networks through which the device 502 can access the ASP services using connectionless data transfer may be referred to herein as accessible networks. Each network in the set of accessible networks may have a network public-key ($PK_{NET}$) and a corresponding network private-key ($SK_{NET}$).

Accordingly, the network information 528 may include a list of accessible networks, where each accessible network may be identified by a network identifier and/or an associated public-key ($PK_{NET}$) (or network certificate, or network public-key ID).

According to aspects described herein, the device 502 might not be attached to the network. According to aspects described herein, the device 502 might not have a subscription to the network.

The device 502 may perform a radio resource control (RRC) procedure to access a network node 504 (e.g., an AN node, a core node of a network, a RAN node) and exchange, for example, RRC messages 1 and 2 with the network node

504. As appreciated by those of skill in the art, RRC message 1 may be a random access channel request (RACH) (e.g., random access request) and RRC message 2 may be a RACH response message 2 (e.g., random access response) 530.

The device 502 may provide a first indication that the request is, for example, for "connectionless data transfer", "data transfer using certificate-based authentication" or something representative of the transfer of data according to the aspects described herein (referred to for clarity and conciseness as "connectionless data transfer" herein). The device 502 may provide the first indication in, for example, an RRC message 3 (RRC connection request) 532. According to a present understanding, there are enough bits to provide the first indication in an RRC message 3.

The network node 504 may reply with a second indication, where the second indication indicates whether the requested connectionless data transfer is possible (i.e., whether connectionless data transfer is supported by the network node 504). The network node 504 may reply (e.g., send the second indication), for example, in an RRC message 4 (e.g., RRC connection setup) 534.

The device 502 may send content (e.g., data, information) to the network node 504 to facilitate the connectionless data transfer in, for example, a "new RRC message 5" (e.g., RRC connection setup complete), if the second indication indicates that connectionless data transfer is possible 536. Aspects of the just-mentioned "new RRC message 5" may be different from aspects associated with a currently known RRC message 5. For example, content of the new RRC message 5 may be prohibited from being transferred to the entity (e.g., transferred to an application server hosting an application of the entity) in an absence of verification. In other words, the set of security information is obtained in a message (e.g., new message 5) whose content is prohibited from being transferred to the entity (e.g., the application server 510) unless the network node (e.g., network node 504) verifies the message based on the set of security information.

The content may include one or more pieces of content. For example, the content may include the set of security information. According to one example, the content may include the device ID and/or at least one of the certificate (e.g., the certificate including the device public-key, where the certificate is signed by the entity), the device public-key, or the device public-key ID. According to one aspect, the set of security information is at least one of a certificate including a device public-key, a device identifier associated with the device public-key, a device public-key, a device public-key identifier, or any combination thereof.

The content of the new RRC message 5 may additionally or alternatively include a random number that the device 502 obtains (e.g., derives, generates). The random number may be, for example, a nonce. For clarity and conciseness of text, the random number obtained by the device 502 and sent to the network node 504 may be referred to herein as the device-nonce or DNonce. However, it is to be understood that the random number may be something other than a nonce. The DNonce may be used, for example, by the network node 504 to protect a downlink PDU (and will be explained below).

For clarity and conciseness of text, the content of the new RRC message 5 may be referred to herein, individually or in any combination, as the "new RRC message 5 content."

The network node 504 may obtain the new RRC message 5 content to facilitate connectionless data transfer. The network node 504 may use the new RRC message 5 content to, for example, identify an application server (e.g., AS 510) associated with the entity and to verify the device public-key 538.

At least three alternatives may exist with regard to usage of the public-key. As mentioned, the new RRC message 5 content may include, for example, a certificate (e.g., a certificate including the device public-key, where the certificate is signed by an entity with which the device will exchange data), a raw device public-key, and/or a device public-key ID. Each of these will now be explained.

According to an aspect, a certificate may be used. The certificate may be self-contained. A certificate may be self-contained in that the certificate, for example, may include a copy of the device public-key and there may be no need to access another entity to obtain a copy of the public-key associated with the device or to verify the raw device public-key presented by the device. To make use of the self-contained certificate, the network node 504 may be provisioned with a list of first entities and their corresponding certificates (e.g., entity-certificate pairs). For example, when the entity is an ASP, the network node 504 may be provisioned with a list including the ASP (e.g., where the list identifies the ASP using an ASP identifier) and a certificate corresponding to the ASP (e.g., an ASP certificate). The network node 504 may use the ASP certificate to verify the certificate signed by the entity 526 (e.g., the certificate signed by the ASP) provided by the device 502 to the network node in the new RRC message 5 content.

Use of a certificate may affect the message size (e.g., size of new RRC message 5 at 536 in FIG. 5). Thus, exemplary alternatives to the certificate are provided below.

According to one aspect, a raw device public-key may be used as an alternative to the certificate. A raw device public-key may be a public-key itself, without any additional data appended thereto. According to one implementation, an entity (e.g., an ASP) may register a set of public-keys (e.g., a set or list of device public-keys, a set or list of registered device public-keys) that can be used to verify a device with the network. The network node 504 may be associated with a repository, referred to herein as a public-key repository node 506. The public-key repository node 506 may be used to keep track of the set of registered public-keys.

According to one aspect, when the network node 504 obtains a raw device public-key, the network node 504 may contact (e.g., exchanging messages with) the public-key repository node 506 to verify the raw device public-key 540. Verification may be implemented, for example, using a Bloom filter created based on the registered public-keys in the public-key repository. As appreciated by persons of skill in the art, a Bloom filter is a probabilistic data structure used to test whether an element is a member of a set.

Each public-key in the public-key repository node 506 may be associated with a specific service, or in other words with a specific entity (e.g., a specific ASP).

As an alternative to the public-key repository node 506, the network may provision each network node 504 (e.g., each AN/core network node) with a digest of registered public-keys. The digest of registered public-keys may be provisioned, for example, in the form of Bloom filter. Also as appreciated by persons of skill in the art, it may be inefficient to have every network node 504 maintain the list of public-keys. Therefore, the use of raw public-keys may make use of a new repository (e.g., the public-key repository node 506) palatable.

According to one aspect, a device public-key ID may be used as an alternative to the certificate. A device public-key ID may be an identifier that is unique to a given public-key. Use of the device public-key ID may require provisioning similar to that of the device raw public-key. For example, according to one implementation, an entity (e.g., an ASP) may register a set of device public-key IDs (e.g., a set or list of device public-key IDs, a set or list of registered device public-key IDs), that can be used to authenticate a device, with the network. The network node 504 may be associated with a repository, referred to again herein as the public-key repository node 506. The public-key repository node 506 may be used to keep track of the list of registered device public-keys and/or registered device public-key IDs.

In an aspect where a device public-key ID is used, the device, when accessing the network node 504, provides the device public-key ID instead of the device public-key itself. This may reduce the message size overhead. In many cases the message size overhead may be reduced because the size of the device public-key ID is smaller than the size of the device public-key itself. In many cases, the message size may be reduced substantially.

According to one aspect, when the network node 504 obtains a device public-key ID from the device 502, the network node 504 may contact (e.g., exchanging messages with) the public-key repository node 506 to obtain the corresponding public-key (i.e., the device public-key uniquely identified by the device public-key ID) from the public-key repository node 506.

The network node 504 may use the obtained corresponding public-key to verify the raw device public-key 540. The network node 504 may retrieve the corresponding public-key from the public-key repository node 506 to implement verification. According to one aspect, the network node 504 (e.g., AN/core network node) may cache device public-keys in order to avoid recurrent (e.g., frequent, numerous, repeated) access to the public-key repository node 506, avoid increased latency, and/or to reduce latency.

Use of device public-key IDs may require a new repository (e.g., public-key repository node 506).

In one aspect, a certificate (with the public-key included therein) may be signed by the device 502 and/or the entity (e.g., the ASP).

In summary, use of a certificate allows for self-contained verification of a device public-key at the network node 504. Use of a raw public-key may require use of a public-key repository node 506, which may store and keep track of registered device public-keys. Verification of a raw public-key at the network node 504 may require contacting the public-key repository node 506 and verification may be implemented using a Bloom filter created based on the registered public-keys in the public-key repository. Use of a public-key ID may require use of a public-key repository node 506, which may store and keep track of registered device public-key IDs. Verification of a public-key ID at the network node 504 may require contacting the public-key repository node 506 and verification may require the network node 504 to retrieve the public-key corresponding to the device public-key ID from the public-key repository node 506.

The network node 504 may obtain (e.g., receive, derive, generate) a random number during the random access procedure, if the network node 504 verifies the device public-key 542. The network node 504 may provide the random number to the device 502 in, for example, the content of a "new RRC message 6" 544. The random number may be used, for example, for replay protection. The random number may be a nonce. The random number may be referred to herein as a network nonce or NNonce.

The device 502 may sign data (e.g., sign a PDU), intended for transfer to the AS 510 of the ASP via the network node 504, with the device private-key ($SK_{Dev}$) 546. The device private-key may be associated with, or correspond to, the device public-key sent in the new RRC message 5.

The signature may be obtained (e.g., derived, generated) based on, for example, a hash of the PDU and the random number (e.g., NNonce) obtained from the network node 504 (e.g., at 544). The device 502 may then send the data (e.g., the PDU) and the signature to the network node 548. In some aspects, the device 502 may send the data and the signature to the network node 504 to transfer the data via the network node 504 in an absence of a pre-established connection to the network.

According to some aspects, encryption of the data may be done in an end-to-end manner (e.g., between the device 502 and the AS 510).

According to some aspects, the PDU can be carried in RRC (e.g., NAS container) or data radio bearer (DRB) (open only for traffic of authenticated device and associated AS).

As described herein, when the device sends the PDU and signature to the network node 548, there may be no device context established for a communication session with the device 502 at the core network. In accordance with aspects described herein, the signature sent with the PDU (at 548) may be associated with the set of security information 520 (e.g., the certificate signed by the entity, the device ID, the raw device public-key, the device public-key ID) sent to the network node 504 from the device 502.

The network node 504 may verify the signature 550 using a device public-key included with the set of security information 520 (e.g., if the set of security information was a certificate signed by the entity and the certificate included the device public-key) or retrieved from the public-key repository node 506 (e.g., if the set of security information was a device identifier, a raw device public-key, or a device public-key identifier (PK ID)).

The network node 504 may forward the PDU 552, 554 to the application server 510 via the core network user-plane node 508. In other words, the network node 504 may forward the PDU toward the associated ASP (or application server 510 associated with the ASP), or may forward the PDU toward a gateway node that forwards it to the ASP (or application server 510 associated with the ASP). In other words, the network node may implement connectionless data transfer in an absence of establishment of a connection between the network node (e.g., an access node) and a user-plane gateway in a core network.

In some aspects described herein, the associated ASP may be identified from an ASP ID indicated in the PDU, the device certificate, or the information associated with the device public-key obtained from the public-key repository node 506.

In some aspects described herein, the network node 504 may be configured to forward the PDU to a specific application server such as the application server 510.

In the exemplary call flow of FIG. 5, the device 502 does not authenticate the network node 504. To enable the device 502 to authenticate the network node 504, either an on-demand signature of the network node or a PDU acknowledgement from the ASP may be used.

In a downlink direction, the network node 504 may obtain, from the application server 510 via the core network user-plane node 508, a PDU 556, 558. To send the PDU to the device 502, the network node 504 may sign the PDU with the network node private-key ($SK_{NNode}$) 560. The signature may be obtained (e.g., derived, generated) based on, for example, a hash of the PDU and the DNonce obtained from the device 502 (e.g., at 536). The network node 504 may then send the device 502 the PDU and the signature (e.g., PDU protected with the signature) 562. When the network node 504 sends the PDU and the signature to the device 502, there may be no device context established for a communication session with the device 502 at the core network. In accordance with aspects described herein, the signature sent with the PDU (at 562) may be associated with a certificate of the network node 504 (e.g., a certificate of the AN/Core Network Node) sent to the device 502 in the content of the message sent at 562. The device 502 may verify the signature of the network node using a public-key of the network node included in the network node certificate 564. The network node certificate may be signed by the mobile network operator (MNO) of the core network.

According to the exemplary call flow of FIG. 5, connectionless data transfer with the network node 504 may be performed when data (e.g., the PDU) needs to be sent from the device 502 to an application server 510 of an ASP via a network. The transfer of data (e.g., the PDU) may take place in an absence of an existing device context between the network node 504 (e.g., RAN, AN/Core Network Node) and the core network through which the PDU travels. State management overhead and signaling overhead may be reduced by use of the exemplary call flow of FIG. 5. For example, the device 502 does not need to perform an authentication and key agreement (AKA) procedure to transfer the PDU, and as-stated, an existing (or pre-existing) device context need not be maintained at the core network.

According to some aspects, for downlink data transfer from the application server 510 to the device 502, for example, in response to device originated data transfer (e.g., mobile originated (MO) data transfer), the network node 504 (e.g., AN/Core Network Node) may keep an RRC connection state (e.g., C-RNTI and radio bearer) established during device 502 uplink small data transfer for a predefined period of time (e.g., the network node 504 may keep a temporary state established).

Downlink traffic such as device 502 terminated small data (e.g., mobile terminated (MT) small data) may be sent to the device 502 based on the temporary state established at the network node 504.

In some implementations, in the device 502 originated small data PDU, the device 502 may include a service area ID to register the device 502 location to the application server 510. The registered service area ID may be used by the application server 510, for example, for application server 510 initiated (i.e., server-initiated) device terminated data transfer. When the device 502 moves into a different service area, the device 502 may register its new service area by sending a PDU (e.g., a dummy PDU) that includes the new service area ID, to the application server 510. In some aspects, the PDU (e.g., dummy PDU) sent to the application server 510 only includes the new service area ID.

In some aspects, to prevent the case that the device 502 and the application server 510 keep exchanging a high volume of PDUs, the network node 504 (e.g., AN/Core Network Node) may keep track of (e.g., monitor, record) an amount of aggregate data transfer between the device 502 and application server 510 for a small data transfer session. If the amount of aggregate data transfer reaches a predefined threshold, the network node 504 may reject device requests to send device 502 originated (e.g., MO) PDUs and/or application server 510 requests to send device 502 terminated (e.g., MT) PDUs in response to the device 502 sending device originated PDUs.

Otherwise, the device 502 may be doing some other service by using connectionless small data service. In other words, the connectionless data transfer may be used for other data exchanges between the device 502 and AS 510 (e.g., for services other than small data transfer).

Figure 6:
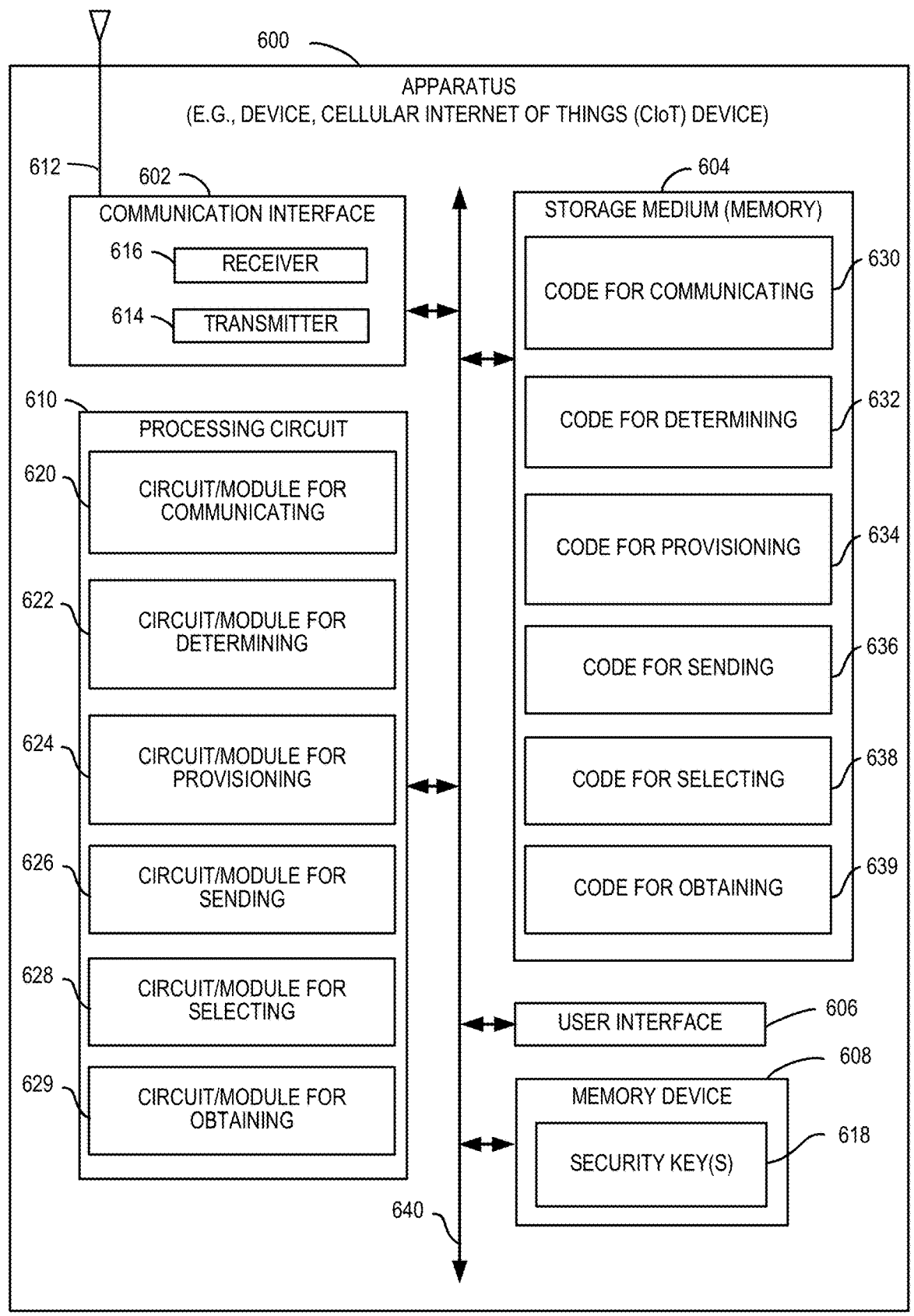
FIG. 6 is a block diagram illustrating an example of a hardware implementation of an apparatus, in accordance with aspects of the disclosure.

FIG. 6 is a block diagram illustrating an example of a hardware implementation of an apparatus 600 (e.g., an electronic device, a communication apparatus, a device, a Cellular Internet of Things (CIoT) device), in accordance with aspects of the disclosure. The apparatus 600 may support data transfer using connectionless data transfer in scenarios where a core network state is not established and one or more of communicating, determining, provisioning, sending (e.g., providing), selecting, or obtaining (e.g., deriving, generating, computing, retrieving, receiving, requesting, etc.) of various content in accordance with aspects of the disclosure takes place. The apparatus 600 could be implemented within a device such as a CIoT device or any type of device that supports wireless communication such as a mobile phone, a smart phone, a tablet, a portable computer, a server, a personal computer, a sensor, an entertainment device, a medical device, or any other electronic device having wireless communication circuitry (e.g., communication interface).

The apparatus 600 may include a communication interface 602 (e.g., at least one transceiver), a storage medium 604, a user interface 606, a memory device 608 (e.g., storing one or more security keys 618), and a processing circuit 610. In various implementations, the user interface 606 may include one or more of: a keypad, a display, a speaker, a microphone, a touchscreen display, or some other circuitry for receiving an input from or sending an output to a user.

These components can be coupled to and/or placed in electrical communication with one another via a signaling bus 640 or other suitable component. The signaling bus 640 may include any number of interconnecting buses and bridges depending on the specific application of the processing circuit 610 and the overall design constraints. The signaling bus 640 links together various circuits such that each of the communication interface 602, the storage medium 604, the user interface 606, and the memory device 608 are coupled to and/or in electrical communication with the processing circuit 610. The signaling bus 640 may also link various other circuits (not shown) such as timing sources, peripherals, voltage regulators, and power management circuits, which are well known in the art, and therefore, will not be described any further.

The communication interface 602 may be adapted to facilitate wireless communication of the apparatus 600. For example, the communication interface 602 may include circuitry and/or programming adapted to facilitate the communication of information bi-directionally with respect to one or more communication devices in a network. In some implementations, the communication interface 602 may be constructed, adapted, and/or configured for wire-based communication. In some implementations, the communication interface 602 may be coupled to one or more antennas 612 for wireless communication within a wireless communication system. The communication interface 602 may be constructed, adapted, and/or configured with one or more standalone receivers and/or transmitters, as well as one or more transceivers. In the illustrated example, the communication interface 602 includes a transmitter 614 and a receiver 616.

The memory device 608 may represent one or more memory devices. As indicated, the memory device 608 may maintain security keys 618 (e.g., a device private-key, a device public-key) along with other information used by the apparatus 600. In some implementations, the memory device 608 and the storage medium 604 are implemented as a common memory component. The memory device 608 may also be used for storing data that is manipulated by the processing circuit 610 or some other component of the apparatus 600.

The storage medium 604 may represent one or more non-transient computer-readable, machine-readable, and/or processor-readable devices for storing programming, such as processor executable code or instructions (e.g., software, firmware), electronic data, databases, or other digital information. The storage medium 604 may also be used for storing data that is manipulated by the processing circuit 610 when executing programming. The storage medium 604 may be any available media that can be accessed by a general purpose or special purpose processor, including portable or fixed storage devices, optical storage devices, and various other mediums capable of storing, containing, or carrying programming.

By way of example and not limitation, the storage medium 604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by the processing circuit 610. The storage medium 604 may be implemented in an article of manufacture (e.g., a computer program product). By way of example, a computer program product may include a non-transient computer-readable medium in packaging materials. In view of the above, in some implementations, the storage medium 604 may be a non-transitory computer readable medium (e.g., a tangible storage medium).

The storage medium 604 may be coupled to the processing circuit 610 such that the processing circuit 610 can read information from, and write information to, the storage medium 604. That is, the storage medium 604 can be coupled to the processing circuit 610 so that the storage medium 604 is at least accessible by the processing circuit 610, including examples where at least one storage medium is integral to the processing circuit 610 and/or examples where at least one storage medium is separate from the processing circuit 610 (e.g., resident in the apparatus 600, external to the apparatus 600, distributed across multiple entities, etc.).

Programming stored by the storage medium 604, when executed by the processing circuit 610, causes the processing circuit 610 to perform one or more of the various functions and/or process operations described herein. For example, the storage medium 604 may include instructions (e.g., code) that could cause the processing circuit 610 to select a network through which the device is authorized to access a service associated with an entity, wherein the entity is associated with the set of security information and the set of security information is provisioned to the device by the entity. The storage medium 604 may include instructions that could cause the processing circuit 610 to send the set of security information to a network node. The storage medium 604 may include instructions that could cause the processing circuit 610 to obtain a random number in response to sending the set of security information if the device is successfully authorized to access the network. The storage medium 604 may include instructions that could cause the processing circuit 610 to obtain a signature by signing a message, which includes the random number and data to be transferred, with a device private-key, wherein a device public-key is associated with the set of security information. The storage medium 604 may also include instructions that could cause the processing circuit 610 to send the data and the signature to the network node to transfer the data via the network node in an absence of a pre-established connection to the network. The storage medium 604 may also include instructions that could cause the processing circuit 610 to utilize the communication interface 602 for wireless, or in some implementations wired, communication utilizing their respective communication protocols.

The processing circuit 610 is generally adapted for processing, including the execution of such programming stored on the storage medium 604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 610 may be arranged to obtain, select, process and/or send data, control data access and storage, issue commands, and control other desired operations. The processing circuit 610 may include circuitry constructed, adapted, and/or configured to implement desired programming provided by appropriate media in at least one example. For example, the processing circuit 610 may be implemented as one or more processors, one or more controllers, and/or other structure constructed, adapted, and/or configured to execute executable programming. Examples of the processing circuit 610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 610 are for illustration and other suitable configurations within the scope of the disclosure are contemplated.

According to one or more aspects of the disclosure, the processing circuit 610 may be adapted to perform any or all of the features, processes, functions, operations, and/or routines for any or all of the apparatuses described herein. For example, the processing circuit 610 may be adapted to perform and/or carry out any one of the operations described in blocks or call flows identified with respect to FIGS. 4, 5, 7, 9, 10 11, and 12. As used herein, the term "adapted" in relation to the processing circuit 610 may refer to the processing circuit 610 being one or more of constructed, configured, employed, implemented, and/or programmed to perform a particular process, function, operation, and/or routine according to various features described herein.

The processing circuit 610 may be a specialized processor, such as an application specific integrated circuit (ASIC) that serves as a means for (e.g., structure for) to performing and/or carrying out any one of the operations described in blocks or call flows identified with respect to FIGS. 4, 5, 7, 9, 10 11, and 12. The processing circuit 610 may serve as one example of a means for transmitting, a means for receiving, a means for communication via a network, means for authenticating, means for obtaining a set of security information, means for selecting a network, means for sending at least one item from the set of security information to a network node, and/or means for obtaining a signature, means for sending a message and signature, by way of example. The communication interface may serve as one example of a means for communication via a network. Another example of means for transmitting may include the communication interface 602, including the transmitter 614 and additionally or alternatively may include the circuit/module for communicating 620, the circuit/module for provisioning 624, and/or the circuit/module for sending 626. Transmitting may include retrieving information from a memory or from another component of the apparatus 600 and broadcasting the information via radio wave transmission from the apparatus 600. Another example of means for receiving may include the communication interface 602, including the receiver 616 and additionally or alternatively may include the circuit/module for communicating 620 and/or the circuit/module for obtaining 629. Receiving may include obtaining radio wave signals from another apparatus and transforming those signals into a baseband signal suitable for use by the processing circuit 610 and/or any circuits or modules thereof. Another example of means for communication via a network may include the communication interface 602, including the transmitter 614 and/or the receiver 616 and additionally or alternatively may include the circuit/module for communicating 620, the circuit/module for provisioning 624, the circuit/module for sending 626, and/or the circuit/module for obtaining 629. Communication via the network may include transmitting and/or receiving signals via the network using hardware and/or software configured for communicating (e.g., connecting, linking, joining, transferring). Another example of means for authenticating may include the processing circuit 610. Authenticating may involve obtaining a key, obtaining a payload, executing an authentication algorithm as understood by those of skill in the art, and outputting a result. Another example of means for obtaining a set of security information may include the processing circuit 610 and/or the circuit/module for obtaining 629. Obtaining the set of security information may include retrieving information from a memory device 608 or from another component of the apparatus 600 (e.g., a receiver 616). The set of security information may be provisioned to the device. The set of security information may include, for example, a device identifier, a pair of device public-private keys, a certificate, a certificate signed by an entity to which data is to be transferred/sent/exchanged, a raw device public-key, a device public-key identifier (ID), and a list of accessible networks. Another example of means for selecting a network may include a circuit/module for selecting 628. Selecting a network may involve choosing a network from a list of networks or picking a network from a list of networks provisioned to the device from an entity. The device may select a network through which the device is authorized to access a service associated with the entity, wherein the entity is associated with a set of security information and the set of security information is provisioned to the device by the entity. Another example of means for sending at least one item from the set of security information to a network node may include the communication interface 602, including the transmitter 614 and additionally or alternatively may include the circuit/module for communicating 620, the circuit/module for provisioning 624, and/or the circuit/module for sending 626. Sending may include retrieving information from a memory device 608 or from another component of the apparatus 600 and transmitting the information via radio wave transmission from the apparatus 600 to a network node. Sending may include sending a set of security information to a network node. For example, the set of security information may be a certificate. The certificate may include the device public-key. The certificate may be signed by an entity that provisioned the certificate to the device. Another example of means for obtaining a signature may include the communication interface 602 including the receiver 616 and additionally or alternatively may include the circuit/module for obtaining 629. Obtaining a signature may include signing a message (and thereby obtaining a signature), including a random number obtained from a network node and data (e.g., a PDU) intended for transfer to the application server (AS) of the entity (e.g., the ASP), with the device private-key. The signature may be obtained (e.g., derived, generated) based, for example, on a hash of the random number obtained from the network node and the data to be sent to the entity (e.g., the ASP). Another example of means for sending a message and signature may include the communication interface 602, including the transmitter 614 and additionally or alternatively may include the circuit/module for communicating 620, the circuit/module for provisioning 624, and/or the circuit/module for sending 626. Sending the message and signature may include transmitting the message and signature via radio wave transmission from the apparatus 600 via the antenna 612 of the apparatus 600.

According to at least one example of the apparatus 600, the processing circuit 610 may include one or more of a circuit/module for communicating 620, a circuit/module for determining 622, a circuit/module for provisioning 624, a circuit/module for sending 626, a circuit/module for selecting 628, or a circuit/module for obtaining 629.

As mentioned above, programming stored by the storage medium 604, when executed by the processing circuit 610, causes the processing circuit 610 to perform one or more of the various functions and/or process operations described herein. For example, the storage medium 604 may include one or more of the code for communicating 630, the code for determining 632, the code for provisioning 634, the code for sending 636, the code for selecting 638, or the code for obtaining 639.

Figure 7:
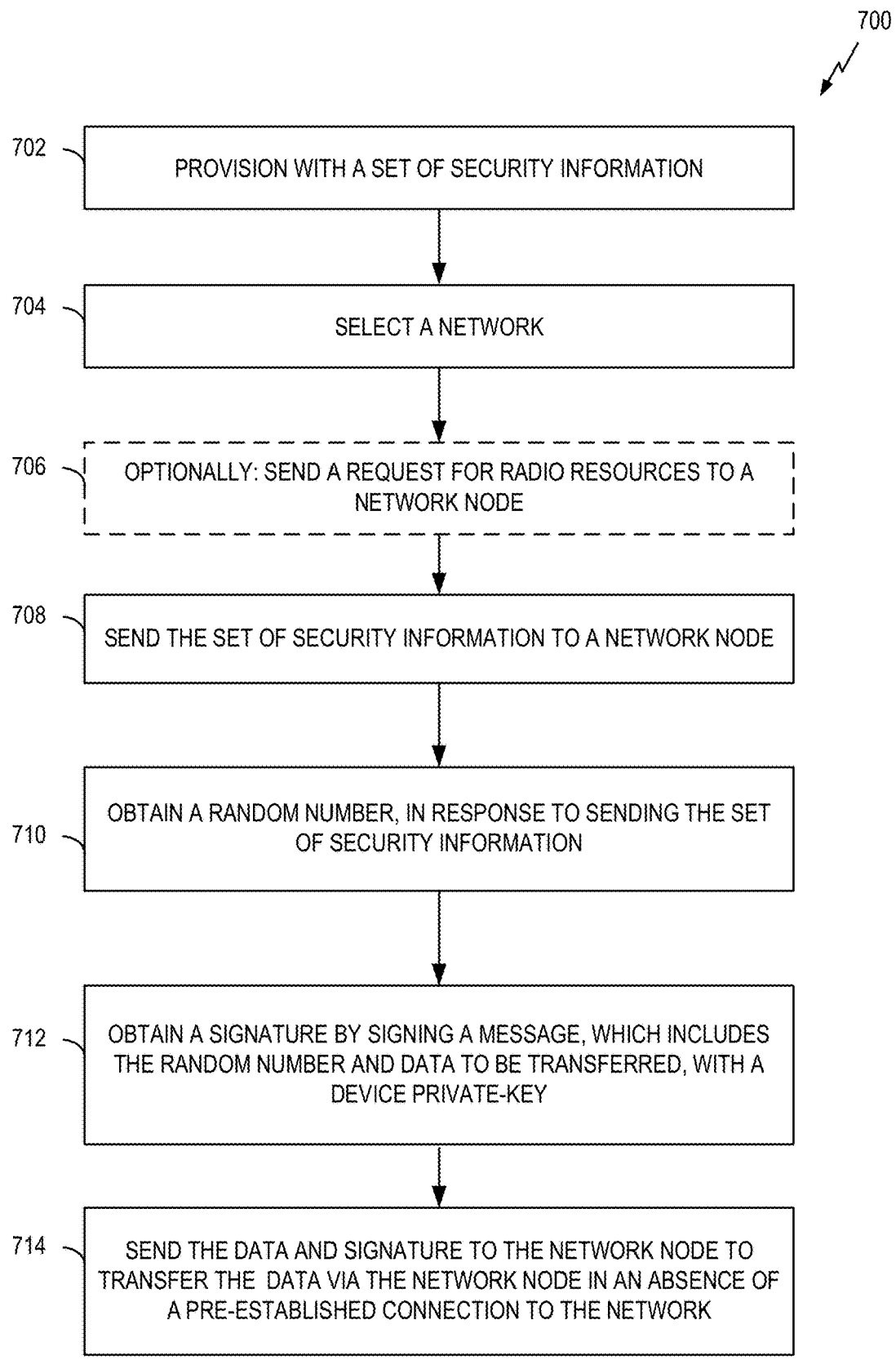
FIG. 7 is a flow diagram illustrating an example of a method of connectionless data transfer, in accordance with aspects of the disclosure.

FIG. 7 is a flow diagram illustrating an example of a method of data transfer 700 using connectionless data transfer, in accordance with aspects of the disclosure. The exemplary flow diagram of FIG. 7 may be representative of a scenario where a core network state is not established and no signaling between an access node (e.g., Cellular Internet of Things (CIoT) base station (C-BS), Evolved Node B (eNodeB)) and a core network node is needed for data transfer. The method of data transfer 700 may be executed by a processing circuit (e.g., the processing circuit 610 of FIG. 6), which may be located in a device or some other suitable apparatus. Accordingly, the method of data transfer 700 may be operational at a device or some other suitable apparatus. In various aspects within the scope of the disclosure, the method of data transfer 700 may be implemented by any suitable apparatus capable of supporting connectionless data transfer in scenarios where a core network state is not established including any suitable apparatus capable of supporting one or more of communicating, determining, provisioning, sending, selecting, or obtaining various content in accordance one or more aspects of the disclosure.

According to some aspects, the method of data transfer 700 using connectionless data transfer in scenarios having an absence of a pre-established connection between the device and the network (e.g., in scenarios where a core network state is not established) may be described as a method operational at a device. The method may include being provisioned with a set of security information 702. In some aspects, the method may include obtaining the set of security information provisioned to the device from an entity to which the device will send data. The entity may be associated with the set of security information. The entity may be associated with the set of security information at least because the entity provisions the set of security information to the device. The entity may also provision the set of security information, or any subset or individual item thereof, to the network (e.g., the network node or a public-key repository). The set of security information may include one or more items. For example, the set of security information may include at least one of a certificate signed by the entity, a device ID, a device public-key, a device public-key ID, or any combination thereof. Each item in the set of security information may be associated with the entity, at least because the entity provisions the set of security information to the device. Additionally, each item in the set of security information may be associated with a device public-key. For example, the certificate signed by the entity may be associated with the device public-key because the certificate may include the device public-key. For example, the device ID may be associated with the device public-key because the device ID may be based on the device public-key (e.g., it may be a hash of the device public-key). For example, the (raw) device public-key may be associated with the device public-key because they are copies of one another. For example, the device public-key ID may be associated with the device public-key because the public-key ID may be used in a table to look-up or be cross-referenced to the device public-key. In summary, the association between the device public-key and each item in the set of security information exists at least because each item in the set of security information includes, is derived from, or is able to be cross-referenced to the device public-key.

The method may include, for example, selecting a network through which the device is authorized to access a service associated with the entity 704, wherein the entity is associated with a set of security information and the set of security information is provisioned to the device by the entity. The entity may be an application service provider (ASP). The network may be selected from a list of accessible networks (e.g., network information) provisioned to the device by the entity.

The method may optionally include sending a request for radio resources to a network node 706, the request including an indication that the request is for connectionless data transfer.

The method may include sending the set of security information to a network node 708. For example, the method may include sending, to a network node (e.g., if the network node supports connectionless data transfer) a certificate signed by the entity. The certificate may include the device public-key. By way of another example, if the set of security information includes at least one of the device ID, the raw device public-key, or the device public-key ID, the method may alternatively include sending, to the network node, at least one of the device ID, the raw device public-key, the device public-key ID, or any combination thereof.

The method may include obtaining a random number (e.g., from the network node) in response to sending the set of security information (e.g., to the network node) 710. In some aspects, the random number may be obtained if the device is successfully authorized by the network node to access the network. The random number may be used in a process to transfer data to the entity via the network node. The random number may be a nonce. A nonce may be a random number that is used only once. The nonce may be referred to herein as a network nonce or an NNonce.

The method may include obtaining a signature by signing a message, which includes the random number and data to be transferred, with a device private-key 712. The device private-key and device public-key are associated as well, at least because they were derived together. The data may be data to be transferred to the entity.

The method further including, sending the data and the signature to the network node to transfer the data (e.g., to the entity or to an application server associated with the entity) via the network node in an absence of a pre-established connection to the network 714.

According to some aspects, the method may further include verifying that the network node supports connectionless data transfer, before sending the set of security information to the network node. According to some aspects, the method further includes sending a request for radio resources to the network node, wherein the request for radio resources includes an indication that the request is for connectionless data transfer. According to some aspects, the device may be authorized to access the network based on the set of security information. According to some aspects, the device might not be attached to the network prior to sending the data and the signature to the network node. According to some aspects, the device might not have a subscription to the network. According to some aspects, the network node is an access node or a core network node. According to some aspects, the set of security information may be at least one of a certificate signed by the entity, a device identifier, a device public-key, a device public-key identifier, or any combination thereof. These may be provisioned at the network by the entity. It is noted that of four options to send the security information to the network: (1) certificate, (2) device identifier, (3) device public-key, (4) device public-key identifier, only the first option is signed by the entity whereas in case of the remaining three options, the security information does not need to be signed, instead they are provisioned at the network.

According to some aspects, the method may further include at least one of: select the network by obtaining an indicator that identifies whether connectionless data transfer is supported, or select the network from a list of networks stored at the device.

According to some aspects, the method may further include providing a device-nonce (DNonce) to the network node, wherein the DNonce may be randomly generated by the device, obtaining a network certificate signed by a mobile network operator, obtaining a packet data unit (PDU) in downlink traffic, wherein the PDU is associated with a signature of a network node, verifying the network certificate using a public-key of the mobile network operator, wherein the network certificate includes a public-key of the network node, and verifying the signature of the network node using the public-key of the network node and a message including the DNonce and the PDU.

According to some aspects, the service associated with the network is a transport service. According to some aspects, the method may further include transferring the data to at least one of the entity or another entity authorized by the entity.

According to some aspects, a transport service of the network may be used to transfer the data from the network node to the entity.

According to some aspects, authentication and/or authorization may be based on use of, or data/information included with, the set of security information.

According to some aspects, the device might not be not attached to the network.

According to some aspects, the device might not have a subscription to the network.

According to some aspects, the method may further include packaging the data as Internet Protocol (IP) data in a packet data unit (PDU).

According to some aspects, the entity may be an application service provider (ASP).

According to some aspects, the network node may be an access node (e.g., Cellular Internet of Things (CIoT) base station (C-BS), Evolved Node B (eNodeB)) or a core network node. According to some aspects, the core network node may be a core network user-plane node.

According to some aspects, the method may further include obtaining an indicator that identifies whether data transfer using connectionless data transfer is supported.

According to some aspects, the certificate may be sent in a message whose content is prohibited from being transferred to the entity in an absence of verification of an item in the set of security information.

According to some aspects, the method further includes obtaining, via provisioning to the device, at least one of a device public-key and the device private-key, a certificate signed by the entity, a device ID, a device public-key ID, and/or the list of networks through which the device is authorized to access the service of the entity.

According to some aspects, the list of networks may include, for each network in the list of networks, a network identifier, and at least one of a network certificate, a network public-key, a network public-key identifier, or any combination thereof.

According to some aspects, the network identifier may identify a wireless wide-area network (WWAN) or a wireless local-area network (wireless LAN).

According to some aspects, the network identifier may be a public land mobile network identifier (PLMN ID) or a service set identifier (SSID).

According to some aspects, the message may include a hash of the random number concatenated with the data.

According to some aspects, the random number may be a nonce.

According to some aspects, the method may further include implementing data transfer using connectionless data transfer in an absence of control-plane signaling between the device and a core network.

According to some aspects, the network node may be an access node (e.g., Cellular Internet of Things (CIoT) base station (C-BS), Evolved Node B (eNodeB)) and the method may further include implementing data transfer using connectionless data transfer in an absence of establishment of a data flow between the access node and a user-plane gateway in a core network.

According to some aspects, the network node may be an access node (e.g., Cellular Internet of Things (CIoT) base station (C-BS), Evolved Node B (eNodeB)) and the method may further include sending the data and the signature in an absence of performing an authentication and key agreement (AKA) procedure between the device and a core network.

According to some aspects, the method may further include sending a device-nonce (DNonce) from the device to the network node (e.g., AN/Core Network Node), wherein the DNonce may be used by the device to verify downlink traffic obtained by the device.

Figure 8:
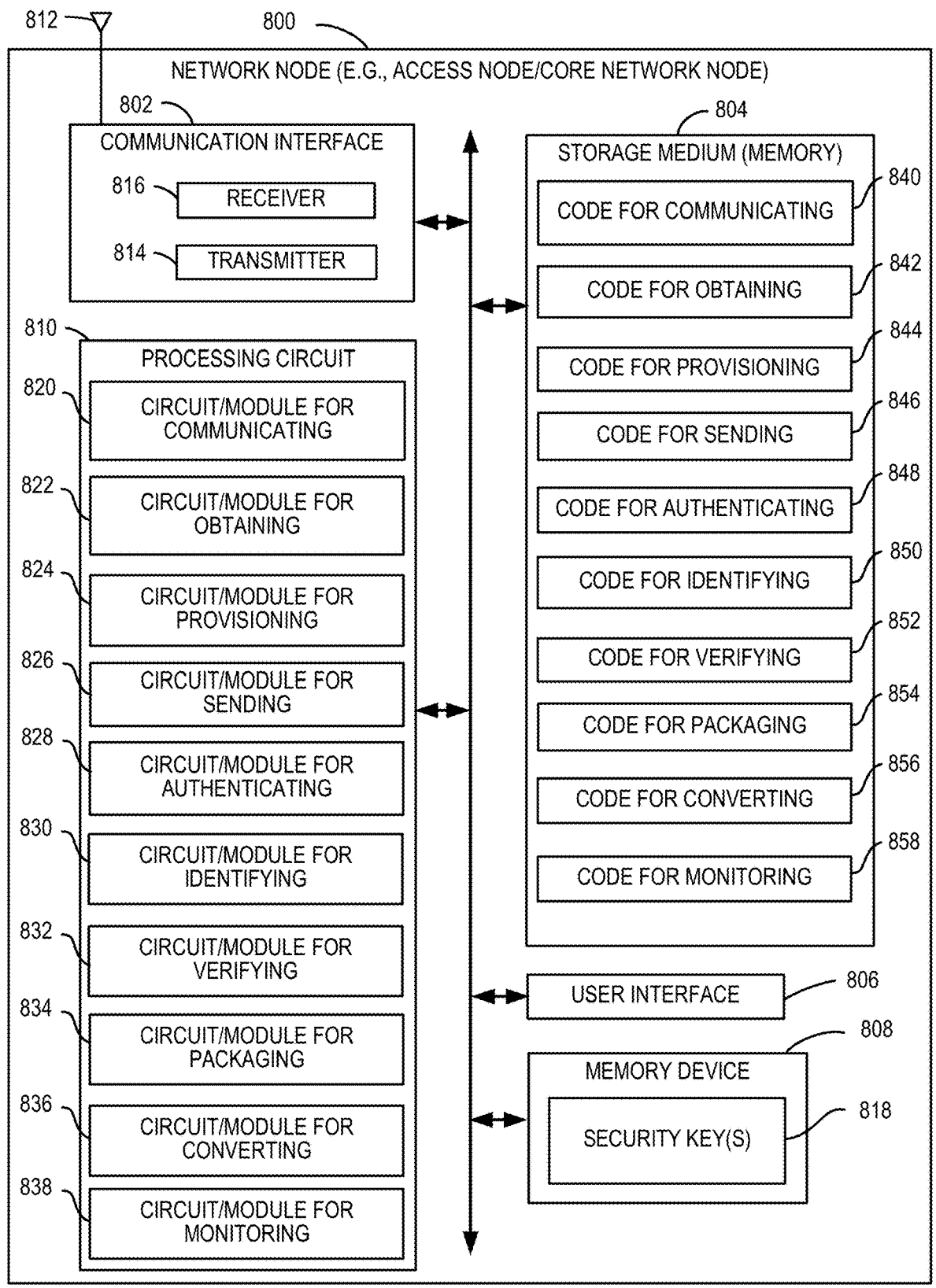
FIG. 8 is a block diagram illustrating another example of a hardware implementation of an apparatus, in accordance with aspects of the disclosure.

FIG. 8 is a block diagram illustrating another example of a hardware implementation of an apparatus 800 (e.g., an electronic device, a communication apparatus, an access network (AN), a core network node), in accordance with aspects of the disclosure. The apparatus 800 may support data transfer using connectionless data transfer in scenarios where a core network state is not established and may support one or more of communicating, obtaining, provisioning, sending, authenticating, identifying, verifying, packaging, and converting according to various aspects of the disclosure. The apparatus 800 could be implemented within access network (AN) node, a core network node, a device (e.g., a CIoT device), or some other type of device that supports wireless communication such as a mobile phone, a smart phone, a tablet, a portable computer, a server, a personal computer, a sensor, an entertainment device, a medical device, or any other electronic device having wireless communication circuitry (e.g., communication interface).

The apparatus 800 may include a communication interface (e.g., at least one transceiver) 802, a storage medium 804, a user interface 806, a memory device 808 (e.g., storing one or more security keys 818), and a processing circuit 810. In various implementations, the user interface 806 may include one or more of: a keypad, a display, a speaker, a microphone, a touchscreen display, or some other circuitry for receiving an input from or sending an output to a user. In general, the components of FIG. 8 may be similar to corresponding components of the apparatus 600 of FIG. 6.

According to one or more aspects of the disclosure, the processing circuit 810 may be adapted to perform any or all of the features, processes, functions, operations, and/or routines for any or all of the apparatuses described herein. For example, the processing circuit 810 may be adapted to perform any of the blocks described with respect to FIGS. 4, 5, 7, 9, 10, 11, and 12. As used herein, the term "adapted" in relation to the processing circuit 810 may refer to the processing circuit 810 being one or more of constructed, configured, employed, implemented, and/or programmed to perform a particular process, function, operation, and/or routine according to various features described herein.

The processing circuit 810 may be a specialized processor, such as an application specific integrated circuit (ASIC) that serves as a means for (e.g., structure for) carrying out any one of the operations described in conjunction with FIGS. 4, 5, 7, 9, 10, 11, and 12. The processing circuit 810 may serve as one example of a means for transmitting, a means for receiving, a means for communication via a network, means for authenticating, means for obtaining data, and/or means for verifying, by way of example. The communication interface may serve as one example of a means for communication via a network. Another example of means for transmitting may include the communication interface 802, including the transmitter 814 and additionally or alternatively may include the circuit/module for communicating 820, the circuit/module for provisioning 824, and/or the circuit/module for sending 826. Transmitting may include retrieving information from a memory or from another component of the apparatus 800 and broadcasting the information via radio wave transmission from the apparatus 800. Another example of means for receiving may include the communication interface 802, including the receiver 816 and additionally or alternatively may include the circuit/module for communicating 820 and/or the circuit/module for obtaining 822. Receiving may include obtaining radio wave signals from another apparatus and transforming those signals into a baseband signal suitable for use by the processing circuit 810 and/or any circuits or modules thereof. Another example of means for communication via a network may include the communication interface 802, including the transmitter 814 and/or the receiver 816 and additionally or alternatively may include the circuit/module for communicating 820, the circuit/module for provisioning 624, the circuit/module for sending 826, and/or the circuit/module for obtaining 822. Communication via the network may include transmitting and/or receiving signals via the network using hardware and/or software configured for communicating (e.g., connecting, linking, joining, transferring). Another example of means for authenticating may include the processing circuit 810. Authenticating may involve obtaining a key, obtaining a payload, executing an authentication algorithm as understood by those of skill in the art, and outputting a result. Another example of means for obtaining data may include the communication interface 802, the receiver 816, and may additionally or alternatively include the circuit/module for obtaining 822. Obtaining data may involve obtaining a message from a device, where the message is signed by the device. The signed message may be obtained from a radio frequency signal. Another example of means for verifying may include the circuit/module for verifying 832. Verifying may include verifying the signature of the device. In some examples, the apparatus 800 may verify the signature of the device using a public-key included in the message (e.g., where the message included a certificate, which itself included the public-key of the device). Other ways to verify the signature of the device are acceptable and are described herein. If the signature (of the device) is successfully verified, the apparatus 800 may send the data (e.g., the PDU) to a data transfer destination via a selected network. The data transfer destination may be, for example, an application server associated with the entity that provisioned the certificate to the device. The data may be sent in an absence of a pre-established connection to the network.

According to at least one example of the apparatus 800, the processing circuit 810 may include one or more of a circuit/module for communicating 820, a circuit/module for obtaining 822, a circuit/module for provisioning 824, a circuit/module for sending 826, a circuit/module for authenticating 828, a circuit/module for identifying 830, a circuit/module for verifying 832, a circuit/module for packaging 834, a circuit/module for converting 836, or a circuit/module for monitoring 838.

As mentioned above, programming stored by the storage medium 804, when executed by the processing circuit 810, may cause the processing circuit 810 to perform one or more of the various functions and/or process operations described herein. For example, the storage medium 804 may include one or more of the code for communicating 840, the code for obtaining 842, the code for provisioning 844, the code for sending 846, the code for authenticating 848, the code for identifying 850, the code for verifying 852, the code for packaging 854, the code for converting 856, the code for monitoring 858.

Figure 9:
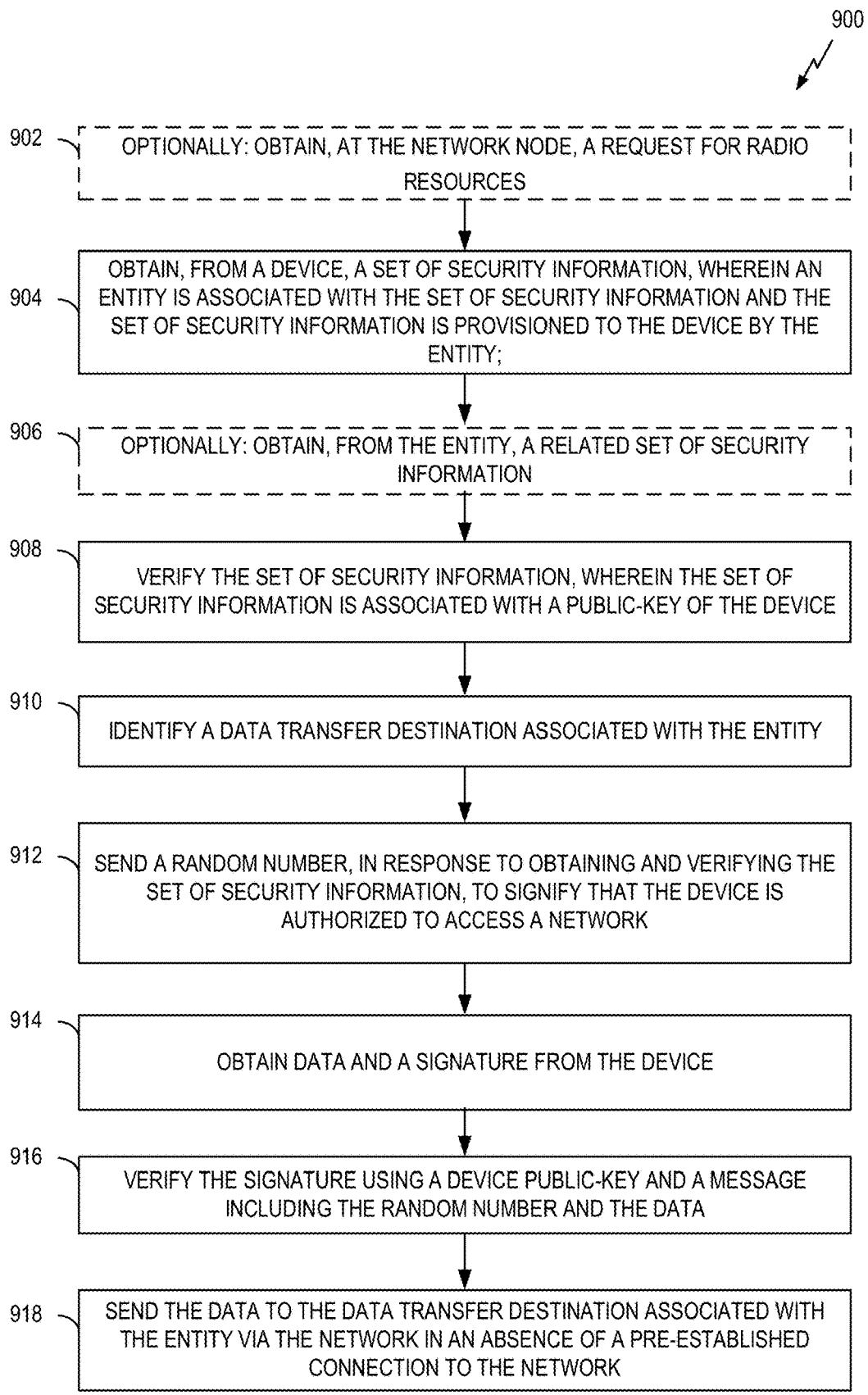
FIG. 9 is a flow diagram illustrating another example of a method of connectionless data transfer, in accordance with aspects of the disclosure.

FIG. 9 is a flow diagram illustrating another example of a method of data transfer 900 using connectionless data transfer, in accordance with aspects of the disclosure. The exemplary flow diagram of FIG. 9 may be representative of a scenario where a core network state is not established and no signaling between an access node (e.g., Cellular Internet of Things (CIoT) base station (C-BS), Evolved Node B (eNodeB)) and a core network node is needed for data transfer. The method of data transfer 900 may be executed by a processing circuit (e.g., the processing circuit 810 of FIG. 8), which may be located in a network node (e.g., AN/Core Network Node) or some other suitable apparatus. Accordingly, the method of data transfer 900 may be operational at a network node or some other suitable apparatus. In various aspects within the scope of the disclosure, the method of data transfer 900 may be implemented by any suitable apparatus capable of supporting connectionless data transfer in scenarios where a core network state is not established including any suitable apparatus capable of supporting one or more of communicating, obtaining, provisioning, sending, authenticating, identifying, verifying, packaging, and converting content according to various aspects of the disclosure.

According to some aspects, the method of data transfer 900 using connectionless data transfer in scenarios where a core network state is not established may be described as a method operational at a network node, which may optionally include, for example, obtaining a request for radio resources from a device 902; however the disclosure is not limited in this aspect. For example, the method may begin in the absence of obtaining a request for radio resources from a device 902 in a case where, for example, there are no uplink scheduled transmissions. In some aspects, the network node may send an indicator to identify whether data transfer using connectionless data transfer is supported.

The method may include obtaining, from a device, a set of security information, wherein an entity is associated with the set of security information and the set of security information is provisioned to the device by the entity 904. In one aspect, the set of security information may be a certificate signed by the entity. The certificate may include a device public-key. The entity may be an application service provider (ASP).

The method may optionally include obtaining, from the entity, a related set of security information 906. The related set of security information may include the device ID, the device public-key, and/or the device public-key ID. In other words, the public-keys and/or public-key IDs of authorized devices are provisioned at the network by the entity. The related set of security information is not limited to these items. The related set of security information may be provisioned at the network by the entity if the set of security information sent to the network node from the device was not a self-contained certificate.

The method may include verifying the set of security information (obtained from the device), wherein the set of security information is associated with a device public-key 908. If the set of security information is a certificate signed by the entity, then the method may include verifying the set of security information using a public-key of the entity. Verifying the set of security information obtained from the device may be based on the related set of security information obtained from the entity (if the set of security information obtained from the device was not, for example, a self-contained certificate), wherein the set of security information obtained from the device and the related set of security information provisioned by the entity are each associated with a device public-key.

The method may include identifying a data transfer destination (e.g., an application server) associated with the entity 910. The data transfer destination may be identified, for example, from a list of application service providers whose devices the network node is permitted to authorize data transfer using connectionless data transfer. The list of application service providers may be provisioned to the network node by the entity.

The method may include sending (to the device) a random number, in response to obtaining and verifying the set of security information, to signify that the device is authorized to access a network 912.

The method may also include, obtaining data and a signature from the device 914. The signature may have been derived using the random number sent to the device and the data sent from the device.

The method may further include verifying the signature using a device public-key and a message including the random number and the data 916.

The method of data transfer 900 further including sending the data to the data transfer destination (e.g., an application server) associated with the entity via the network in an absence of a pre-established connection to the network 918.

According to some aspects, as stated, the method may include obtaining a request for radio resources from the device, wherein the request for radio resources may include an indication that the request is for connectionless data transfer. According to some aspects, the method may include identifying the data transfer destination (e.g., an application server) from a list of application service providers.

According to some aspects, the device is authorized to access the network based on the set of security information.

According to some aspects, the service of the network is used to transfer the data from the network node to an application server associated with the entity.

According to some aspects, the network node is permitted to authorize connectionless data transfer to devices associated with application service providers identified in a list of application service providers provisioned to the network.

According to some aspects, the network node may be an access node (e.g., Cellular Internet of Things (CIoT) base station (C-BS), Evolved Node B (eNodeB)) or a core network node. According to some aspects, the core network node may be a core network user-plane node.

According to some aspects, the set of security information is at least one of a certificate signed by the entity, a device identifier (associated with the device public-key), a device public-key, a device public-key identifier, or any combination thereof.

According to some aspects, the set of security information is obtained in a message whose content is prohibited from being transferred to the entity unless the network node verifies the message based on the set of security information.

According to some aspects, the network node may be an access node and the method may further include implementing connectionless data transfer in an absence of establishment of a connection between the access node and a user-plane gateway in a core network.

According to some aspects, the method may further include obtaining a network certificate signed by a mobile network operator, obtaining a device-nonce (DNonce) from the device to use with downlink traffic, obtaining a packet data unit (PDU) in downlink traffic, signing a message, including the DNonce and the PDU, with a network node private-key to obtain a signature to protect the PDU, and sending the PDU, the signature, and the network certificate to the device.

According to some aspects, the device might not be registered to the network via the network node, which means that the network does not have a device context. As used herein, when a device is not registered to a network it is "connectionless" in that there is no device context in the network.

According to some aspects, the device might not have a subscription to the network.

According to some aspects, the network node may be an access node (e.g., Cellular Internet of Things (CIoT) base station (C-BS), Evolved Node B (eNodeB)) and the method may further include implementing data transfer using connectionless data transfer in an absence of establishment of a data flow between the access node and a user-plane gateway in a core network.

According to some aspects, the network node may be an access node (e.g., Cellular Internet of Things (CIoT) base station (C-BS), Evolved Node B (eNodeB)) and the method may further include obtaining the data and the signature in an absence of performing an authentication and key agreement (AKA) procedure between the device and a core network.

According to some aspects, the entity may be an application service provider and the method may further include sending the data to the application server of the entity by, for example, identifying the entity from an application service provider identifier included in the data.

Figure 10A:
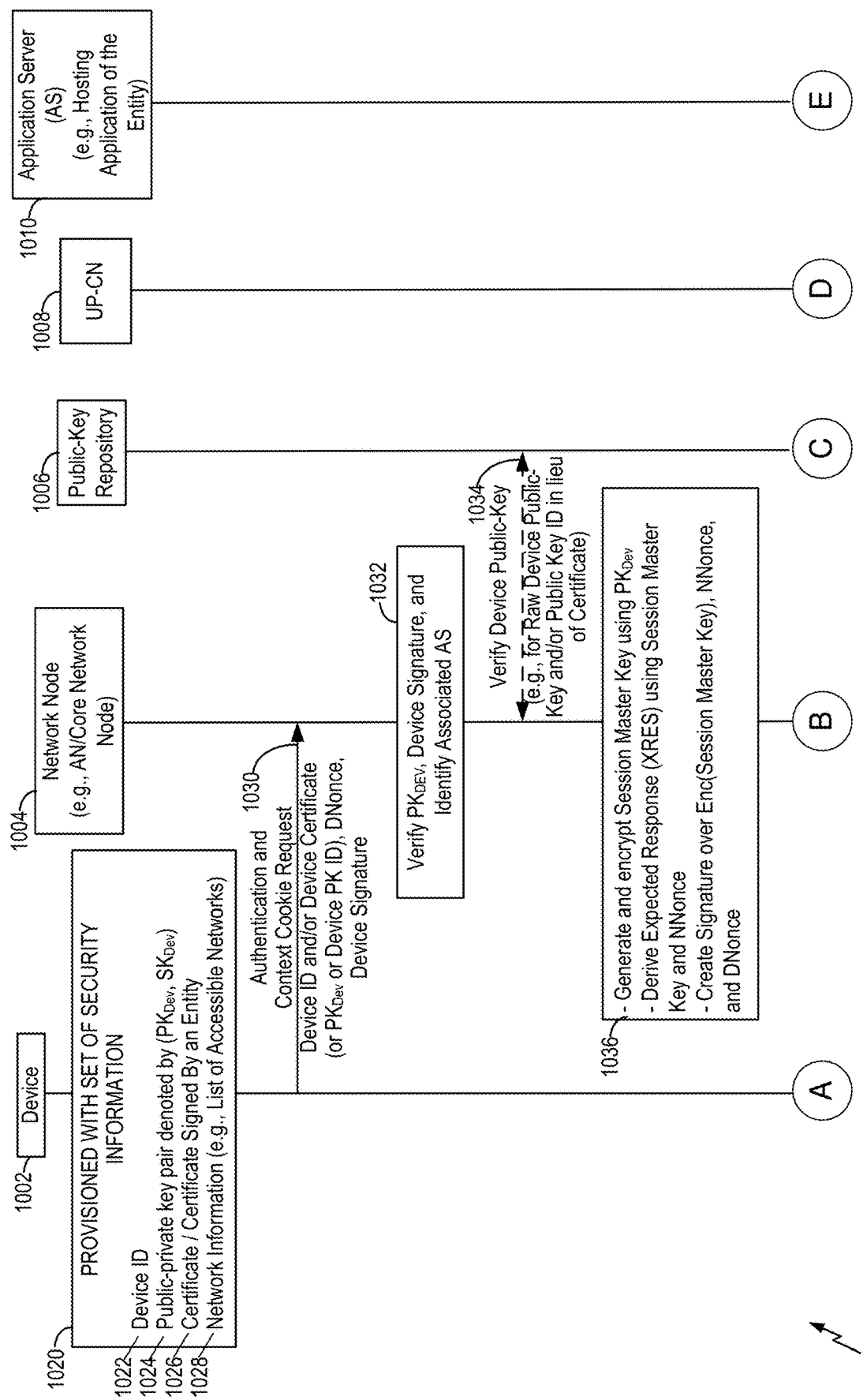
FIGS. 10A and 10B is a call flow diagram illustrating an example of connectionless data transfer, in accordance with aspects of the disclosure.
Figure 10B:
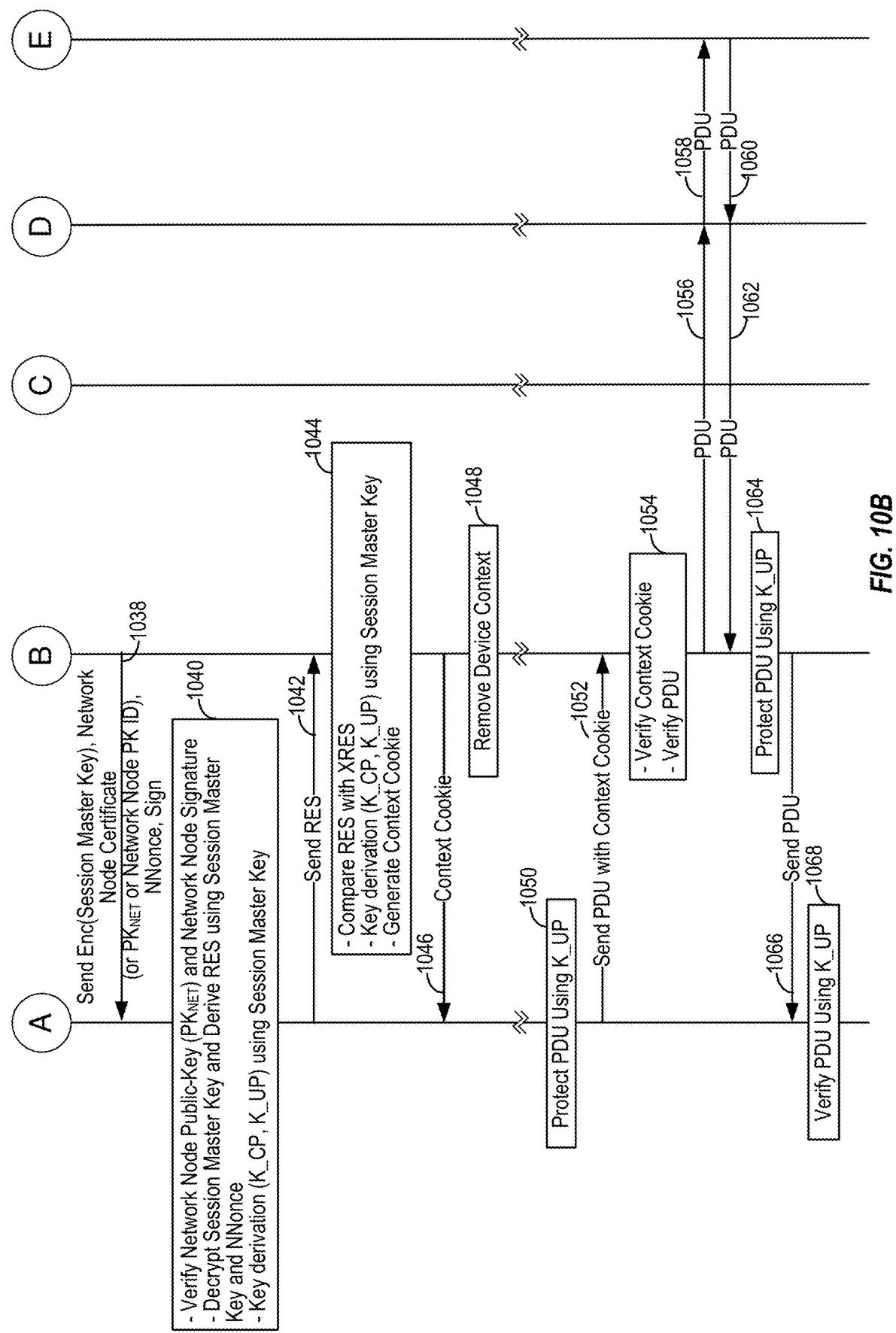

FIGS. 10A and 10B is a call flow diagram 1000 illustrating example of data transfer using connectionless data transfer, in accordance with aspects of the disclosure. The call flow diagram 1000 is divided between two drawing sheets to improve readability. Respective connectors labeled A, B, C, D, and E on each drawing sheet join the two sheets of FIGS. 10A and 10B together. The call flow diagram 1000 of FIGS. 10A and 10B may be representative of a scenario where a core network state is not established and no signaling between an access node (e.g., Cellular Internet of Things (CIoT) base station (C-BS), Evolved Node B (eNodeB)) and a core network node is needed for data transfer. The example of FIGS. 10A and 10B may also be described as a call flow diagram 1000 illustrating an exemplary procedure where a network node authenticates, and establishes a context for, a device using a public-key credential, in accordance with aspects of the disclosure. In the exemplary call flow of FIGS. 10A and 10B, there is included a device 1002 (e.g., a wireless device, a cellular device, a UE, a CIoT device), a network node (e.g., an AN node or core network node) referred to herein as network node 1004, a public-key repository node 1006, a core network user-plane node (referred to herein as a UP-CN 1008) (e.g., a P-GW), and an application server node (referred to herein as AS 1010).

The exemplary call flow of FIGS. 10A and 10B may begin with provisioning 1020 of a set of security information (e.g., device identifier, public-private key pair, a certificate/certificate signed by an entity, and/or a list of accessible networks) to the device 1002. In one aspect, the device 1002 may be deployed after provisioning.

The device 1002 may be provisioned with a device identifier that uniquely identifies the device (hereinafter referred to as device ID) 1022. According to one aspect, the device ID may be a hash of the device public-key. Accordingly, the device ID may be associated with the device public-key.

The device 1002 may be provisioned with a public-private key pair denoted by ($PK_{Dev}$, $SK_{Dev}$) 1024. The device private-key ($SK_{Dev}$) may be held in a secure storage of the device. By way of example, the device public-key ($PK_{Dev}$) and the device private-key ($SK_{Dev}$) may be provisioned by a provisioning entity. Examples of a provisioning entity may include a mobile network operator (MNO), a service provider, an application service provider (ASP), and/or a content provider.

The device 1002 may be provisioned with a certificate or a certificate that may be signed by an entity 1026. The certificate or certificate signed by the entity may include the device public-key. Alternatives to the certificate signed by the entity include the device ID, a raw device public-key, or a device public-key identifier. The entity may provide services (e.g., electric power delivery monitored bay an electric power meter, health monitoring, news delivery) to the device 1002 or collect data (e.g., health data, home/building security) from the device 1002. Examples of the device 1002 may include sensor devices. Examples of sensor devices may include power meters, wearable health monitors (e.g., for blood pressure, heart rate, motion monitoring, and monitors for other physiological parameters), weight scales, still/video cameras, security monitors (e.g., such as building entry detectors, fire/smoke/water detectors), appliance monitors (e.g., such as refrigerator/freezer monitors), sound monitors/microphones/speakers (e.g., such as for interactive audio exchanges with a local or remote information service provider).

According to one aspect, the entity may be an Application Service Provider (ASP). The entity may be the provisioning entity or a different entity. The entity may have an entity public-private key pair. According to the exemplary aspect where the entity is an ASP, the ASP may have an ASP public-key ($PK_{AS}$) and an ASP private-key ($SK_{AS}$). As appreciated by those of skill in the art, the certificate may include diverse data, which may include the device public-key ($PK_{Dev}$). The certificate may signed using the entity private-key. According to the exemplary aspect where the entity is the ASP, the certificate may signed using the ASP private-key ($SK_{AS}$). Accordingly, the certificate signed by the entity may be a certificate including the device public-key ($PK_{Dev}$) signed using the ASP private-key ($SK_{AS}$). According to one aspect, the certificate signed by the entity may include only the device public-key ($PK_{Dev}$).

A first alternative to the certificate may be a device public-key ($PK_{Dev}$) itself (e.g., without additional data). This may be referred to as a raw public-key (e.g., a raw device public-key). According to the first alternative, the certificate signed using the entity private-key may be replaced by a raw device public-key. The device public-key is provisioned at the network by the ASP associated with the device public-key (i.e., the ASP provisions the device public-key to the network) so that the device public-key can be verified by the network when the device public-key is presented to the network by the device.

A second alternative to the certificate may be a public-key identifier (PK ID). A PK ID may an identifier used to uniquely identify a public-key such as the device public-key. By using a PK ID, the public-key (which is identified by the PK ID) does not need to be included in a message. This reduces the message size overhead. In many aspects, this reduces the message size overhead substantially as device public-keys can be lengthy. According to the second alternative, the certificate signed using the entity private-key may be replaced by the device public-key identifier (device PK ID) and the device public-key identifier and the corresponding device public-key are provisioned to the network by the ASP associated with the device public-key (i.e., the ASP provisions device PK ID and the device public-key to the network) so that the device public-key can be verified by the network when the device PK ID is presented by the device to the network.

The device may also be provisioned with network information 1028. The network information may include identification of a set of networks. The networks in the set of networks may be identified using respective network identifiers (e.g., public land mobile network identifiers (PLMN IDs) or a service set identifiers (SSIDs)). The networks identified in the set of networks may include those networks through which the device 1002 can access the ASP services (e.g., networks through which the device 1002 can send/obtain (e.g., transmit/receive) data to/from an application server (e.g., AS 1010) hosting the ASP services) using connectionless data transfer as described herein. Networks through which the device 1002 can access the ASP services using connectionless data transfer may be referred to herein as accessible networks. Each network in the set of accessible networks may have a network public-key ($PK_{NET}$) and a corresponding network private-key ($SK_{NET}$).

Accordingly, the network information 1028 may include a list of accessible networks, where each accessible network may be identified by a network identifier and/or an associated public-key ($PK_{NET}$) (or network certificate, or network public-key ID).

According to one aspect, the network may be provisioned with a list of application service providers (ASPs) (and the corresponding ASP certificates) whose devices the network node 1004 is permitted to authenticate and permitted to authorize data transfer using connectionless data transfer. The device 1002 and network node 1004 may authenticate during an attach procedure with each other based on the certificates (e.g., based on the device certificate (including $PK_{Dev}$) and the network certificate (including $PK_{NET}$)).

According to one aspect, the device 1002 may send an authentication and context cookie request (i.e., a request for both authentication and a context cookie) 1030. The authentication and context cookie request may include (or be sent with) with a device ID and/or a device certificate (including $PK_{Dev}$) (or $PK_{Dev}$ (i.e., a raw $PK_{Dev}$) or a device PK ID), a nonce (DNonce), and a device signature.

According to one aspect, the network node 1004 verifies the device certificate (or $PK_{Dev}$ (i.e., a raw $PK_{Dev}$) or the $PK_{Dev}$ corresponding to the device PK ID) and verifies the device signature 1032, 1034. The network node may also identify an application server (AS) associated with the device certificate (or associated with the $PK_{Dev}$). If the verification is successful, the network node 1004 may obtain (e.g., derive, generate, create, compute) a session master key (e.g., K_ASME) and may encrypt the session master key using the device public-key ($PK_{Dev}$). As used herein, the session master key may be referred to as an anchor key or a master key of an authentication session. The network node 1004 may also obtain (e.g., derive, generate, create, compute) an expected response (XRES) using the session master key and a network node nonce (NNonce). The network node 1004 may also obtain (e.g., derive, generate, create, compute) a network node signature over Enc(session master key), NNonce, and DNonce 1036. The network node 1004 may then send, to the device 1002, the encrypted session master key (Enc(session master key)), the network node certificate (including $PK_{NET}$) (or $PK_{NET}$ (i.e., a raw $PK_{NET}$) or the network node PK ID), the network node nonce (NNonce), and the network node signature 1038.

According to some implementations, the device 1002 may verify the network certificate (e.g., verify the $PK_{NET}$) and verify the network node signature. If the verification is successful, the device may decrypt the session master key and obtain (e.g., derive, generate, create, compute) the authentication response (RES) using the session master key and NNonce. The device 1002 may also obtain (e.g., derive, generate, create, compute) control-plane and user-plane keys (K_CP, K_UP) using the session master key 1040.

According to some aspects, the device 1002 may then send, to the network node 1004, the authentication response (RES) 1042.

According to some aspects, the network node 1004 may verify the authentication response (RES), for example by comparing the RES to the XRES. If verification is successful, the network node 1004 may also obtain (e.g., derive, generate, create, compute) control-plane and user-plane keys (K_CP, K_UP) using the session master key; and, if verification is successful, the network node 1004 may obtain (e.g., derive, generate, create, compute) the context cookie for small data transfer 1044. The context cookie may be based on a device context (e.g., security context and/or service context) generated during the authentication process.

According to some aspects, the network node 1004 may send, to the device 1002, the context cookie 1046. The context cookie may include the information of the associated application server (AS) identified based on the device certificate and the session master key (and/or the control-plane and user-plane keys) obtained as a result of the authentication. The context cookie may be encrypted using a key only known to the network node. Hence, the context cookie can only be decrypted and verified by the network node. Thereafter, the network node 1004 may remove the device context 1048. Accordingly, thereafter, a device context between the network node 1004 and the core network no longer exists.

Subsequent to the removal of the device context from the core network (at 1048), the device may obtain a PDU for transmission in uplink traffic. The device 1002 may protect the PDU using K_UP 1050. The device may send, to the network node 1004, the protected PDU with the context cookie 1052.

According to some aspects, the network node 1004 may verify the context cookie and verify the protected PDU 1054. If verification is successful, the network node 1004 may forwards the PDU towards the associated AS 1010 via the UP-CN 1008 (1056, 1058).

According to some implementations, the associated AS 1010 may be identified, by the network node 1004, from the context cookie.

According to some implementations, the network node 1004 may be configured as to how to forward the PDU to a specific AS.

In downlink traffic, a PDU may be forwarded to the network node 1004 from the AS 1010 via the UP-CN 1008 (1060, 1062). The network node 1004 may protect the PDU using K_UP 1064. The network node 1004 may send, to the device 1002, the protected PDU 1066. The device 1002 may verify the protected PDU using K_UP 1068.

According to some aspects, for downlink data transfer from the AS 1010 to the device 1002, for example, in response to device 1002 originated data transfer (e.g., mobile originated (MO) data transfer), the network node 1004 (e.g., access network (AN) node/core network node) may keep an RRC connection state (e.g., C-RNTI and radio bearer) established during device 1002 uplink small data transfer for a predefined period of time.

Downlink traffic such as device 1002 terminated small data (e.g., mobile terminated (MT) small data) may be sent to the device 1002 based on a temporary state maintained at the network node 1004.

In some implementations, in the device 1002 originated small data PDU, the device 1002 may include a service area ID to register the device 1002 location to the AS 1010. The registered service area ID may be used by the AS 1010, for example, for AS 1010 initiated (i.e., server-initiated) device terminated data transfer. When the device 1002 moves into a different service area, the device 1002 may register its new service area by sending a PDU (e.g., a dummy PDU) that includes the new service area ID, to the AS 1010. In some aspects, the PDU (e.g., dummy PDU) sent to the AS 1010 only includes the new service area ID.

In some aspects, to prevent the case that the device 1002 and the AS 1010 keep exchanging a high volume of PDUs, the network node 1004 (e.g., AN/core network node) may keep track of (e.g., monitor, record) an amount of aggregate data transfer between the device 1002 and AS 1010 for a small data transfer session. If the amount of aggregate data transfer reaches a predefined threshold, the network node 1004 may decide to reject device requests to send device 1002 originated (e.g., MO) PDUs and/or AS 1010 requests to send device 1002 terminated (e.g., MT) PDUs in response to the device 1002 sending device originated PDUs.

Otherwise, the device 1002 may be doing some other service by using connectionless small data service. In other words, the connectionless data transfer may be used for other data exchange between the device 1002 and AS 1010 (e.g., for services other than small data transfer).

Figure 11:
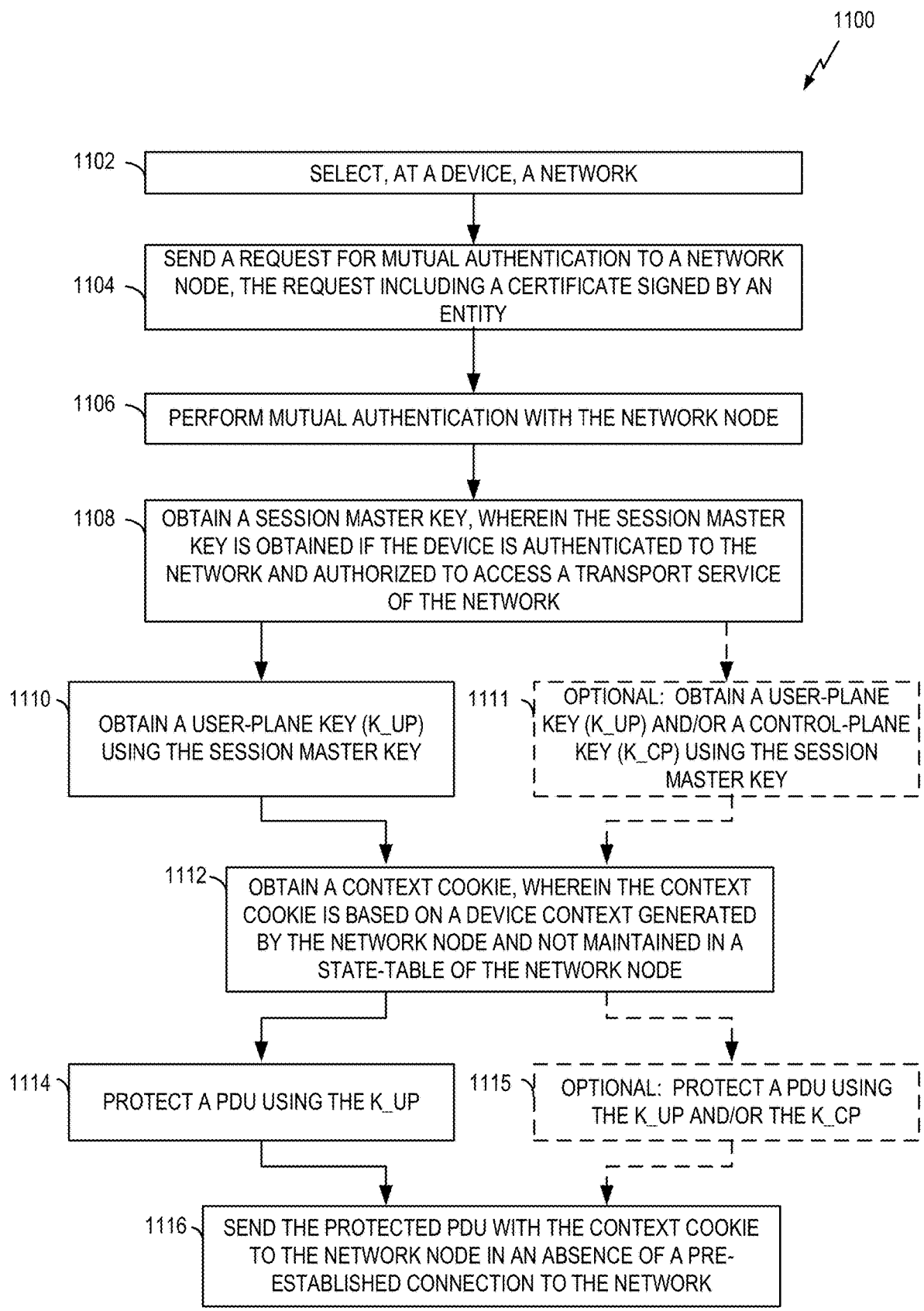
FIG. 11 is a flow diagram illustrating an example of a method of connectionless data transfer, in accordance with aspects of the disclosure.

FIG. 11 is a flow diagram illustrating an example of a method of data transfer 1100 using connectionless data transfer, in accordance with aspects of the disclosure. The exemplary flow diagram of FIG. 11 may be representative of a scenario where a core network state is not established and no signaling between an access node (e.g., Cellular Internet of Things (CIoT) base station (C-BS), Evolved Node B (eNodeB)) and a core network node is needed for data transfer. The example of FIG. 11 may also be described as a flow diagram illustrating an exemplary procedure where a device is authenticated, and has context established, by a network node using a public-key credential, in accordance with aspects of the disclosure. The method of data transfer 1100 may be executed by a processing circuit (e.g., the processing circuit 610 of FIG. 6), which may be located in a device or some other suitable apparatus. Accordingly, the method of data transfer 1100 may be operational at a device or some other suitable apparatus. In various aspects within the scope of the disclosure, the method of data transfer 1100 may be implemented by any suitable apparatus capable of supporting connectionless data transfer in scenarios where a core network state is not established (e.g., during data transfer) including supporting one or more of communicating, determining, provisioning, sending, selecting, or obtaining various content in accordance one or more aspects of the disclosure.

According to some aspects, the method of data transfer 1100 using connectionless data transfer in scenarios where a core network state is not established may be described as a method operational at a device, and may include, for example, selecting a network through which the device is authorized to access a service of an entity 1102. The network may be selected from a list of networks. Sending a request for mutual authentication to a network node, the request including a certificate signed by the entity 1104. Performing mutual authentication with the network node 1106. Obtaining a session master key, wherein the session master key may be obtained if the device is authenticated to the network and authorized to access a service of the network to transfer data to the entity via the network node 1108. The service may be, for example, a transport service associated with the network. The method of data transfer 1100 may include obtaining a user-plane key (K_UP) using the session master key 1110. According to one alternative, the method of data transfer 1100 may optionally include obtaining the user-plane key (K_UP) and/or a control-plane key (K_CP) using the session master key 1111. The method of data transfer 1100 may further include obtaining a context cookie, wherein the context cookie may be based on a device context generated by the network node and not maintained in a state-table of the network node 1112. The method of data transfer 1100 may further include protecting a PDU using the K_UP 1114. According to the alternative, the method of data transfer 1100 may optionally include protecting the PDU using the K_UP and/or the K_CP 1115. The method of data transfer 1100 may further including sending the protected PDU with the context cookie to the network node in an absence of a pre-established connection to the network 1116.

According to some implementations, the session master key and the context cookie may be obtained during mutual authentication. The device context may generated by the network node based on the authentication, and may be generated during mutual authentication.

According to some implementations, the method may further include obtaining a control-plane key (K_CP) using the session master key, and protecting the PDU using the K_UP and/or the K_CP.

According to some implementations, the service associated with the network may be used to send the protected PDU from the network node to the entity.

According to some implementations, the session master key may be encrypted by the network using the device public-key, and the method further includes decrypting the session master key by the device using the device private-key.

According to some aspects, the device might not be attached to the network via the network node.

According to some aspects, the device might not have a subscription to the network.

According to some aspects, the entity may be an application service provider (ASP).

According to some aspects, the network node may be an access node (e.g., Cellular Internet of Things (CIoT) base station (C-BS), Evolved Node B (eNodeB)) or a core network node. According to some aspects, the core network node may be a core network user-plane node.

According to some aspects, the certificate may include a device public-key.

According to some aspects, the certificate may be replaced by a device identifier, a device public-key, and/or a device public-key identifier.

According to some aspects, the context cookie may include an identifier of an application server of an entity associated with the device, and may represent an authentication of the device to the network and an authorization given to the device to access a service associated with the network to transfer data to the application server of the entity in the absence of the pre-established connection to the network. In some aspects, the service may be a transport service.

According to some aspects, the method may further include obtaining a packet data unit (PDU) in downlink traffic, wherein the PDU is protected using the K_UP, and verifying the PDU using the K_UP.

Figure 12:
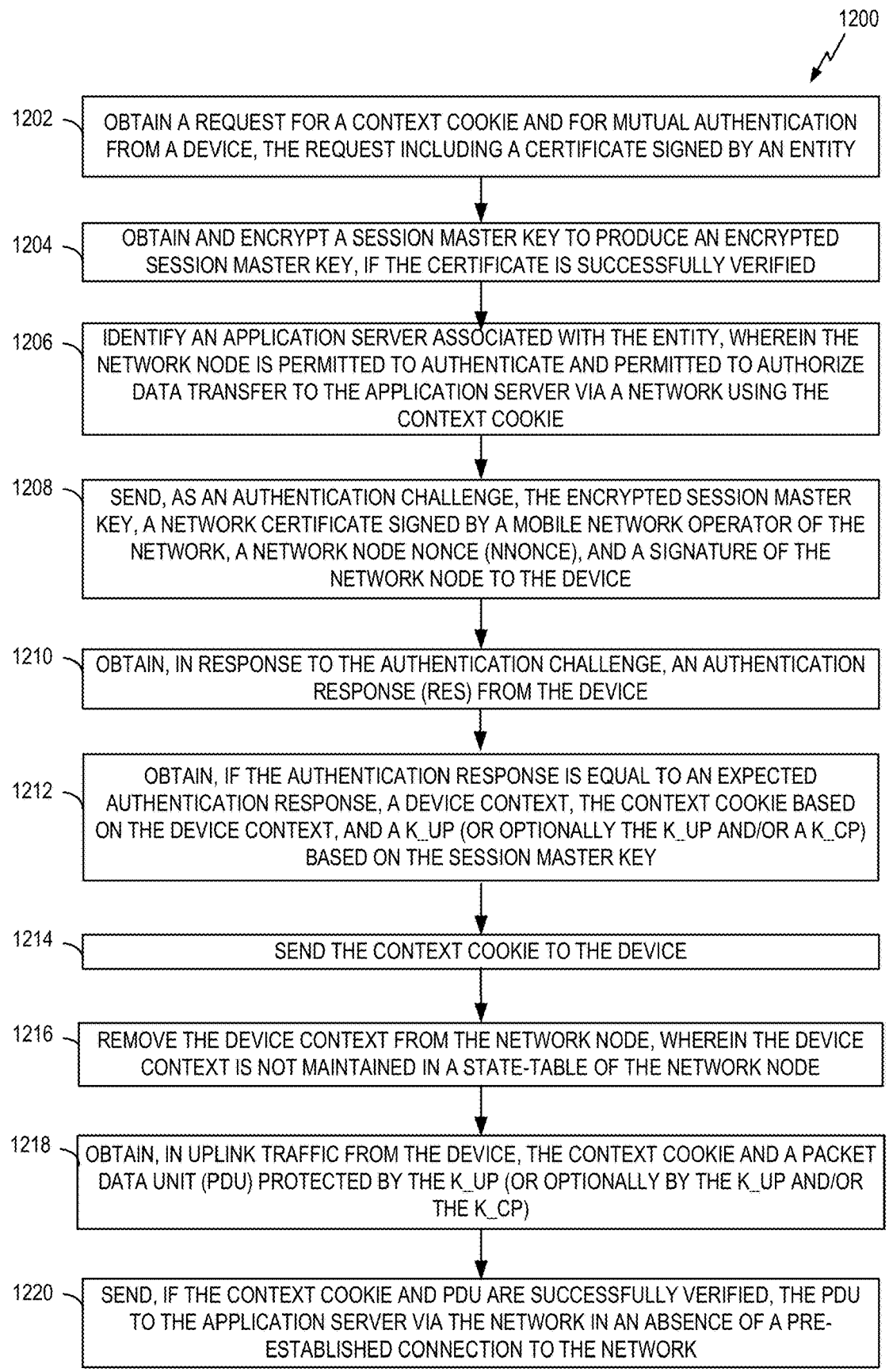
FIG. 12 is a flow diagram illustrating another example of a method of connectionless data transfer, in accordance with aspects of the disclosure.

FIG. 12 is a flow diagram illustrating another example of a method of data transfer 1200 using connectionless data transfer, in accordance with aspects of the disclosure. The exemplary flow diagram of FIG. 12 may be representative of a scenario where a core network state is not established and no signaling between an access node (e.g., Cellular Internet of Things (CIoT) base station (C-BS), Evolved Node B (eNodeB)) and a core network node is needed for data transfer. The example of FIG. 12 may also be described as a flow diagram illustrating an exemplary procedure where a network node authenticates, and establishes a context for, a device using a public-key credential, in accordance with aspects of the disclosure. The method of data transfer 1200 may be executed by a processing circuit (e.g., the processing circuit 810 of FIG. 8), which may be located in a network node (e.g., AN/core network node, RAN) or some other suitable apparatus. Accordingly, the method of data transfer 1200 may be operational at a network node or some other suitable apparatus. In various aspects within the scope of the disclosure, the method of data transfer 1200 may be implemented by any suitable apparatus capable of supporting connectionless data transfer in scenarios where a core network state is not established (e.g., during data transfer) including one or more of communicating, determining, provisioning, sending, selecting, or obtaining various content in accordance one or more aspects of the disclosure.

According to some aspects, the method of data transfer 1200 using connectionless data transfer in scenarios where a core network state is not established may be described as a method operational at a device, and may include, for example, obtaining a request for a context cookie and for mutual authentication from a device, the request including a certificate signed by an entity 1202. Obtaining and encrypting a session master key to produce an encrypted session master key, if the certificate is successfully verified 1204. Identifying an application server associated with the entity, wherein the network node is permitted to authenticate and permitted to authorize data transfer to the application server via a network using the context cookie 1206. Sending, as an authentication challenge, the encrypted session master key, a network certificate signed by a mobile network operator of the network, a network node nonce (NNonce), and a signature of the network node to the device 1208. Obtaining, in response to the authentication challenge, an authentication response (RES) from the device 1210. Obtaining, if the authentication response is equal to an expected authentication response, a device context, the context cookie based on the device context, and a K_UP (or optionally the K_UP and/or a K_CP) based on the session master key 1212. The method further may include sending the context cookie to the device 1214. The method may further include removing the device context from the network node, wherein the device context is not maintained in a state-table of the network node 1216. The method may include obtaining, by the network node in uplink traffic from the device, the context cookie and a packet data unit (PDU) protected by the K_UP (or optionally protected by the K_UP and/or the K_CP) 1218. The method further including sending, if the context cookie and PDU are successfully verified, the PDU to the application server via the network in an absence of a pre-established connection to the network 1220.

According to some aspects, the method may further include obtaining the user-plane key (K_UP) and/or a control-plane key (K_CP) based on the session master key, if the authentication response is equal to the expected authentication response, and obtaining, in uplink traffic from the device, the context cookie and the packet data unit (PDU) protected by the K_UP and/or the K_CP.

According to some aspects, the session master key may be encrypted using the device public-key included in the device certificate.

According to some aspects, the device might not be attached to the network via the network node.

According to some aspects, the device might not have a subscription to the network.

According to some aspects, if uplink traffic from the device is not in a form of a PDU, the method further includes packaging the uplink traffic as Internet Protocol (IP) data in a PDU.

According to some aspects, the entity may be an application service provider (ASP).

According to some aspects, the network node may be an access node (e.g., Cellular Internet of Things (CIoT) base station (C-BS), Evolved Node B (eNodeB)) or a core network node. According to some aspects, the core network node may be a core network user-plane node.

According to some aspects, the certificate includes a device public-key.

According to some aspects, the certificate may be replaced by a device identifier, a device public-key, and/or a device public-key identifier.

According to some aspects, the certificate may be sent in a message whose content is prohibited from being transferred to the entity in an absence of verification.

According to some aspects, the method may further include storing a network node public-key and a network node private-key, storing the certificate signed by the mobile network operator, and/or storing a list of application service providers whose devices the network node is permitted to authenticate and permitted to authorize data transfer to an associated application server via the network using the context cookie.

According to some aspects, the list includes, for each application service provider (ASP) on the list, an ASP identifier and at least one of an ASP certificate, an ASP public-key, an ASP public-key identifier, or any combination thereof.

According to some aspects, the list may be obtained from a mobile network operator and may be based on a service level agreement between the mobile network operator and the entity.

According to some aspects, the network node may be an access node (e.g., Cellular Internet of Things (CIoT) base station (C-BS), Evolved Node B (eNodeB)) and the method may further include implementing data transfer using the context cookie in an absence of establishment of a bearer (e.g., a data flow) between the access node and a user-plane gateway in a core network.

According to some aspects, the network node may be an access node (e.g., Cellular Internet of Things (CIoT) base station (C-BS), Evolved Node B (eNodeB)) and the method may further include obtaining the PDU and context cookie in an absence of performing an authentication and key agreement (AKA) procedure between the device and a core network.

According to some aspects, the method may further include obtaining information as to how and/or where to forward and/or process the PDU obtained from the device.

According to some aspects, the entity may be an application service provider and the method may further include sending the PDU to the application server of the entity by identifying the entity from an application service provider identifier included in the PDU, a device public-key, or the PDU and the device public-key.

According to some aspects, if the uplink traffic is not in PDU form, the method may further include converting the uplink traffic into Internet Protocol (IP) packets on behalf of the device and sending the IP packets in the PDU to the application server.

According to some aspects, the method may further include obtaining a packet data unit (PDU) in downlink traffic, protecting the PDU using the K_UP, and sending the protected PDU to the device.

Figure 13:
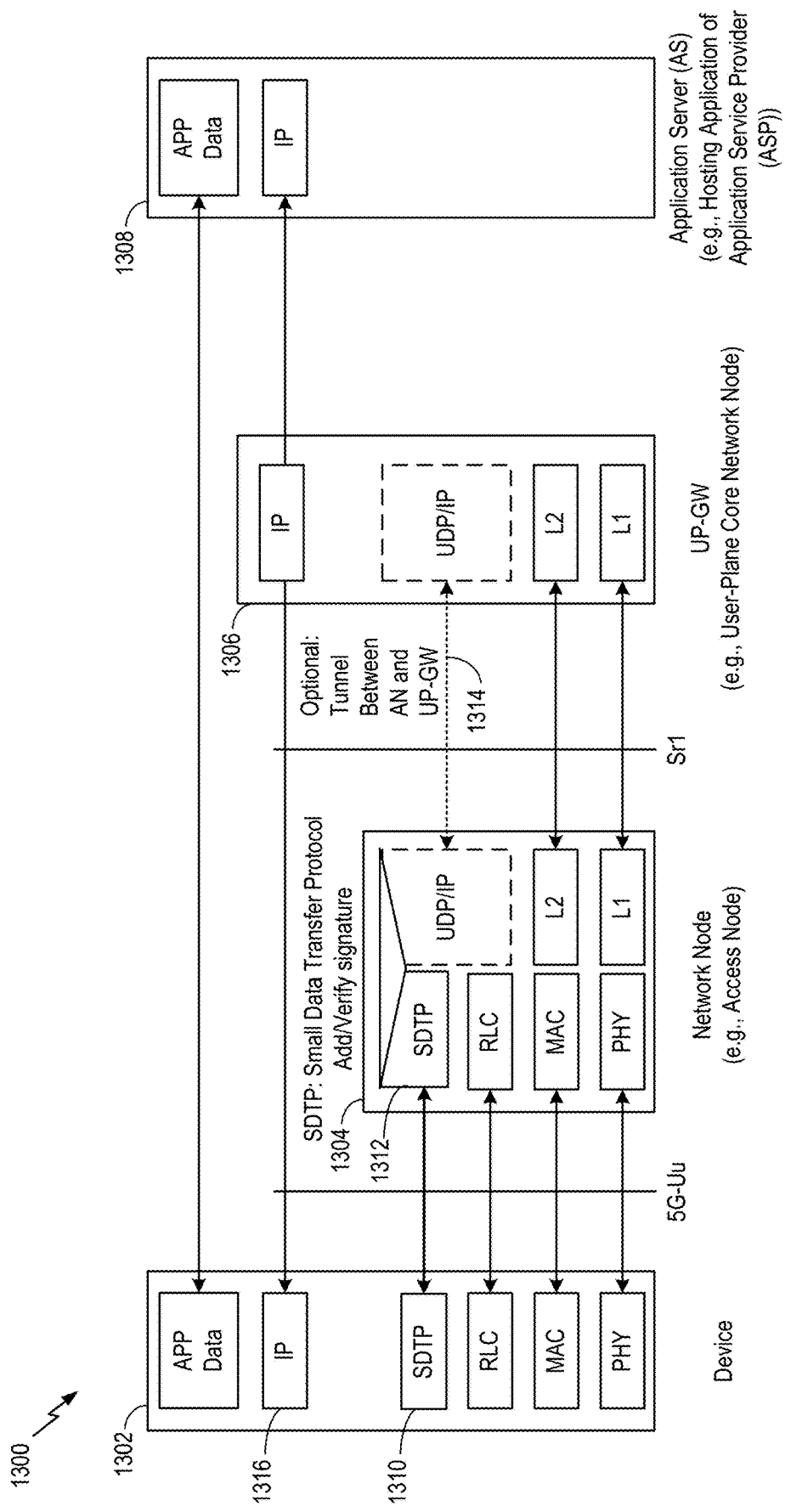
FIG. 13 is an illustration of a user-plane protocol stack, in accordance with aspects of the disclosure.

FIG. 13 is an illustration of a user-plane protocol stack 1300 in accordance with aspects of the disclosure. The user-plane protocol stack 1300 is representative of a case where the device 1302 has an IP stack 1316. FIG. 13 illustrates portions of a user-plane protocol stack for the device 1302, a network node 1304 (e.g., an access network (AN) node, a RAN node), a user-plane gateway (UP-GW) 1306 (e.g., User-Plane Core Network (UP-CN) Node), and an application server (AS) 1308 (e.g., hosting an application of application service provider (ASP)). The user-plane protocol stack of the device 1302 includes a small data transfer protocol (SDTP) layer 1310 corresponding to an SDTP layer 1312 in the user-plane protocol stack of the network node 1304. According to some aspects, the SDTP layer 1310, 1312 may be used, for example, to add and/or verify signatures of the device 1302 and/or network node 1304. An optional tunnel 1314 for data transfer between the network node 1304 and UP-GW 1306 using User Datagram Protocol/Internet Protocol (UDP/IP) is also illustrated.

Figure 14:
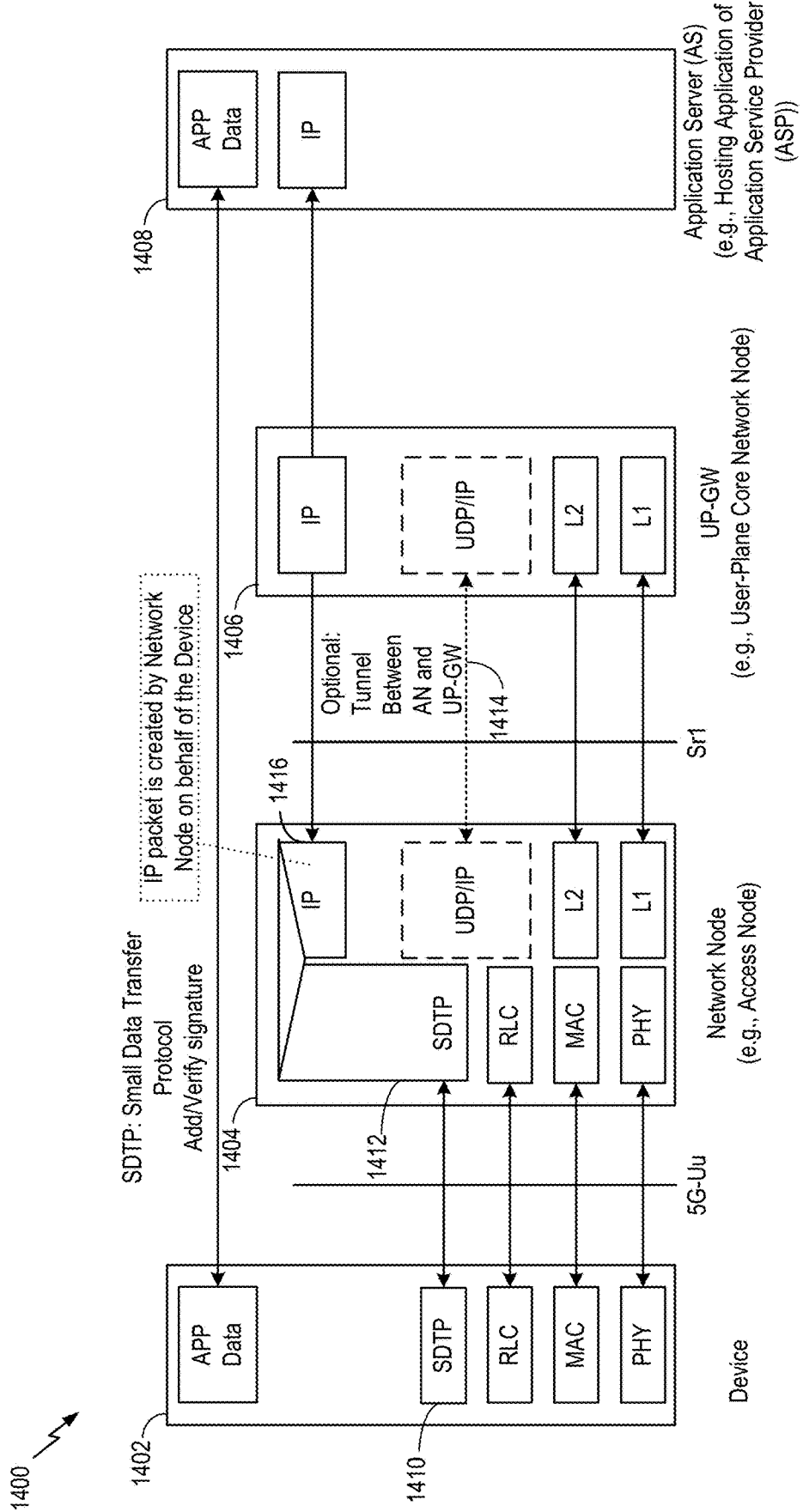
FIG. 14 is an illustration of another user-plane protocol stack, in accordance with aspects of the disclosure.

FIG. 14 is an illustration of another user-plane protocol stack 1400 in accordance with aspects of the disclosure. The user-plane protocol stack 1400 is representative of a case where the device 1402 does not have an IP stack. FIG. 14 illustrates portions of a user-plane protocol stack for the device 1402, a network node 1404 (e.g., an access network (AN) node, a RAN node), a user-plane gateway (UP-GW) 1406 (e.g., User-Plane Core Network (UP-CN) Node), and an application server (AS) 1408 (e.g., hosting an application of application service provider (ASP)). The user-plane protocol stack of the device 1402 includes a small data transfer protocol (SDTP) layer 1410 corresponding to an SDTP layer 1412 in the user-plane protocol stack of the network node 1404. According to some aspects, the SDTP layer 1410, 1412 may be used, for example, to add and/or verify signatures of the device 1402 and/or network node 1404. In the exemplary user-plane protocol stack 1400, the device 1402 does not include an IP stack and provides data to the network node 1404 that is not in IP packet form. Accordingly, the IP stack 1416 of the network node 1404 (e.g., an access network (AN) node, a RAN node) may convert uplink traffic into Internet Protocol (IP) packets on behalf of the device. The IP packets may be packaged into a PDU for transport to the application server 1408. An optional tunnel 1414 for data transfer between the network node 1404 and UP-GW 1406 using UDP/IP is also illustrated.

Figure 15:
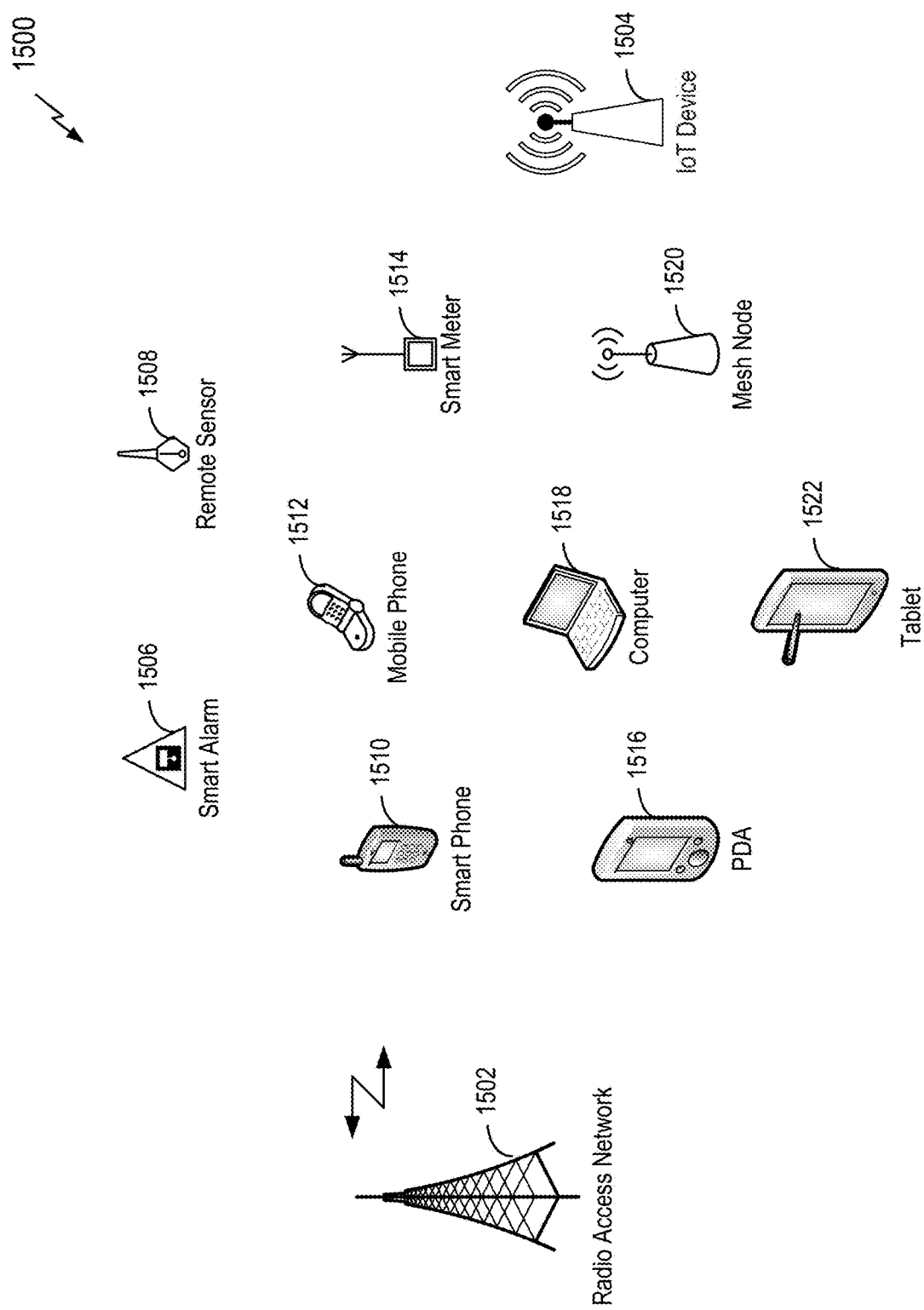
FIG. 15 is a schematic illustration of a portion of a wireless communication network including an access node (e.g., Cellular Internet of Things (CIoT) base station (C-BS), Evolved Node B (eNodeB)) and multiple communication entities, as it may appear in accordance with aspects of the disclosure.

FIG. 15 is a schematic illustration of a portion of a wireless communication network 1500 including a radio access network access node 1502 (e.g., Cellular Internet of Things (CIoT) base station (C-BS), Evolved Node B (eNodeB)) and multiple communication entities as it may appear in aspects of the disclosure. As described herein, a cellular device, a CIoT device, an LTE wireless cellular device, and/or a machine-type communications wireless cellular device may reside in, or be a part of a device, where the device may be, for example, an IoT device 1504, a smart alarm 1506, a remote sensor 1508, a smart phone 1510, a mobile phone 1512, a smart meter 1514, a personal digital assistant (PDA) 1516, a personal computer 1518, a mesh node 1520, and/or a tablet computer 1522. According to some aspects described herein, the device may transfer data via a network node (e.g., an access node 1502 or a core network node (not shown)) to an application server (not shown) associated with an entity (e.g., an application service provider) under a scenario where a core network state is not established and no signaling between the access node 1502 and a core network node is needed for the data transfer. Accordingly, aspects described herein may enable a device (e.g., an IoT device 1504, a smart alarm 1506, a remote sensor 1508, a smart phone 1510, a mobile phone 1512, a smart meter 1514, a personal digital assistant (PDA) 1516, a personal computer 1518, a mesh node 1520, and/or a tablet computer 1522) to communicate with a service without being registered to a network. Of course, the illustrated devices or components are examples, and any suitable node or device may appear within a wireless communication network within the scope of the present disclosure. These examples are provided to illustrate certain concepts of the disclosure. Those of ordinary skill in the art will appreciate that these are exemplary in nature, and other examples may fall within the scope of the disclosure and the appended claims.

Summary of Additional Subject Matter

According to an implementation, the disclosure may provide a device that may include a communication interface and a processing circuit coupled to the communication interface, where the processing circuit may be configured to, for example, select a network through which the device is authorized to access a service associated with an entity. The processing circuit may be further configured to send, to a network node, if the network node supports connectionless data transfer (e.g., using certificate-based authentication), a certificate signed by the entity. The processing circuit of the device may obtain a random number, in response to sending the certificate, wherein the random number is obtained if the device is successfully authenticated to the network and authorized to access a service associated with the network. According to one aspect, the processing circuit of the device may obtain a signature by signing a message, which includes the random number and data to be transferred, with a device private-key, wherein the device private-key is associated with the certificate. In some aspects, the processing circuit and/or communication interface may be further configured to send the data and the signature to the network node to transfer the data via the network node in an absence of a pre-established connection to the network.

According to some aspects, the disclosure may provide a method of data transfer operational at a device. The method may include selecting a network through which the device is authorized to access a service associated with an entity. The method may further include sending, to a network node, if the network node supports connectionless data transfer (e.g., using certificate-based authentication), a certificate signed by the entity. In some aspects, the method may further include obtaining a random number, in response to sending the certificate, wherein the random number is obtained if the device is successfully authenticated to the network and authorized to access a service associated with the network. The method may still further include obtaining a signature by signing a message, which includes the random number and data to be transferred, with a device private-key, wherein the device private-key is associated with the certificate. In some aspects, the method may still further include sending the data and the signature to the network node to transfer the data via the network node in an absence of a pre-established connection to the network.

In some aspects, the disclosure may provide a device that includes means for communicating via a network. Aspects may further include means for selecting the network through which the device is authorized to access a service associated with an entity. Aspects of the disclosure may still further include means for sending, to a network node, if the network node supports connectionless data transfer (e.g., using certificate-based authentication), a certificate signed by the entity, and means for obtaining a random number, in response to sending the certificate, wherein the random number is obtained if the device is successfully authenticated to the network and authorized to access a service associated with the network. Means for obtaining a random number may include any random number generator circuit know to those of skill in the art. A random number may be generated in any way known to those of skill in the art. According to some implementations, the disclosure may still further provide means for obtaining a signature by signing a message, which includes the random number and data to be transferred, with a device private-key, wherein the device private-key is associated with the certificate, at the device. According to some aspects, the means for communicating and/or another means may be configured to send the data and the signature to the network node to transfer the data via the network node in an absence of a pre-established connection to the network.

According to some aspects, the disclosure may provide a non-transitory computer-readable medium storing computer-executable code for wireless communication including code to select a network through which the device is authorized to access a service associated with an entity. The code may include code to send, to a network node, if the network node supports connectionless data transfer (e.g., using certificate-based authentication), a certificate signed by the entity and obtain a random number, in response to sending the certificate, wherein the random number is obtained if the device is successfully authenticated to the network and authorized to access a service associated with the network. In some implementations, the disclosure may further provide in or with the non-transitory computer-readable medium storing computer-executable code, code to obtain a signature by signing a message, which includes the random number and data to be transferred, with a device private-key, wherein the device private-key is associated with the certificate, and code to send the data and the signature to the network node to transfer the data via the network node in an absence of a pre-established connection to the network.

In some aspects, the disclosure may provide a device, including a communication interface and a processing circuit coupled to the communication interface. In some aspects the processing circuit may be configured to select a network through which the device is authorized to access a service of an entity. The processing circuit may additionally be configured to send a request for mutual authentication to a network node, the request including a certificate signed by the entity. In some implementations, the processing circuit may be further configured to perform mutual authentication with the network node and may obtain a session master key, wherein the session master key is obtained if the device is authenticated to the network and authorized to access a service associated with the network. In some aspects, the processing circuit may obtain a user-plane key (K_UP) using the session master key. The processing circuit may obtain, form a network node, a context cookie, wherein the context cookie is based on a device context generated by the network node and not maintained in a state-table of the network node. According to some aspects, the processing circuit may be further configured to protect a PDU using the K_UP and send the protected PDU with the context cookie to the network node in an absence of a pre-established connection to the network.

According to some implementations, the disclosure may provide a method of data transfer operational at a device. The method may include selecting a network through which the device is authorized to access a service of an entity, sending a request for mutual authentication to a network node, the request including a certificate signed by the entity, performing mutual authentication with the network node, obtaining a session master key, wherein the session master key is obtained if the device is authenticated to the network and authorized to access a service associated with network, obtaining a user-plane key (K_UP) using the session master key, obtaining a context cookie, wherein the context cookie is based on a device context generated by the network node and not maintained in a state-table of the network node, protecting a PDU using the K_UP, and sending the protected PDU with the context cookie to the network node in an absence of a pre-established connection to the network.

In some aspects the disclosure may provide a device including: means for communicating via a network, means for selecting the network through which the device is authorized to access a service of an entity, means for sending a request for mutual authentication to a network node, the request including a certificate signed by the entity, means for performing mutual authentication with the network node, means for obtaining a session master key, wherein the session master key is obtained if the device is authenticated to the network and authorized to access a service associated with network, means for obtaining a user-plane key (K_UP) using the session master key, means for obtaining a context cookie, wherein the context cookie is based on a device context generated by the network node and not maintained in a state-table of the network node, means for protecting a PDU using the K_UP, and means for sending the protected PDU with the context cookie to the network node in an absence of a pre-established connection to the network. In some aspects of the disclosure the means for sending a request for mutual authentication to a network node may be implemented using a communication interface and more particularly may be implemented using a transmitter such as transmitter 614 as shown and described in FIG. 6. In some aspects, the means for performing mutual authentication with the network node, the means for obtaining a session master key, the means for obtaining a user-plane key (K_UP) using the session master key, the means for obtaining a context cookie, and/or the means for protecting a PDU using the K_UP may be implemented using a processing circuit such as the processing circuit 610 as shown and described in FIG. 6. In some aspects of the disclosure, the means for sending the protected PDU with the context cookie to the network node in an absence of a pre-established connection to the network may be implemented using a communication interface and more particularly may be implemented using a transmitter such as transmitter 614 as shown and described in FIG. 6.

In still other aspects, the disclosure may provide a non-transitory computer-readable medium storing computer-executable code for wireless communication including code to select a network through which the device is authorized to access a service of an entity, send a request for mutual authentication to a network node, the request including a certificate signed by the entity, perform mutual authentication with the network node, obtain a session master key, wherein the session master key is obtained if the device is authenticated to the network and authorized to access a service associated with the network, obtain a user-plane key (K_UP) using the session master key, obtain a context cookie, wherein the context cookie is based on a device context generated by the network node and not maintained in a state-table of the network node, protect a PDU using the K_UP, and send the protected PDU with the context cookie to the network node in an absence of a pre-established connection to the network.

According to some aspect, the disclosure may provide a network node including a communication interface and a processing circuit coupled to the communication interface. According to some implementations, the processing circuit may be configured to: obtain a request for a context cookie and for mutual authentication from a device, the request including a device certificate signed by an entity, obtain and encrypt a session master key to produce an encrypted session master key, if the device certificate is successfully verified, identify an application server associated with the entity, wherein the network node is permitted to authenticate and permitted to authorize data transfer to the application server via a network using the context cookie, send, as an authentication challenge, the encrypted session master key, a network certificate signed by a mobile network operator of the network, a network node nonce (NNonce), and a signature of the network node to the device, and obtain, in response to the authentication challenge, an authentication response (RES) from the device. According to some aspects, the processing circuit may be further configured to obtain, if the authentication response is equal to an expected authentication response: a device context, the context cookie based on the device context, and a user-plane key (K_UP) based on the session master key. According to some aspects, the processing circuit may be further configured to send the context cookie to the device and remove the device context from the network node, wherein the device context is not maintained in a state-table of the network node. According to some aspects, the processing circuit may be further configured to obtain, in uplink traffic from the device, the context cookie and a packet data unit (PDU) protected by the K_UP, and send, if the context cookie and PDU are successfully verified, the PDU to the application server via the network in an absence of a pre-established connection to the network.

In some implementations, the disclosure may provide a method of data transfer data, operational at a network node, including: obtaining a request for a context cookie and for mutual authentication from a device, the request including a device certificate signed by an entity, obtaining and encrypting a session master key to produce an encrypted session master key, if the device certificate is successfully verified, identifying an application server associated with the entity, wherein the network node is permitted to authenticate and permitted to authorize data transfer to the application server via a network using the context cookie, sending, as an authentication challenge, the encrypted session master key, a network certificate signed by a mobile network operator of the network, a network node nonce (NNonce), and a signature of the network node to the device, obtaining, in response to the authentication challenge, an authentication response (RES) from the device, obtaining, if the authentication response is equal to an expected authentication response: a device context, the context cookie based on the device context, and a user-plane key (K_UP) based on the session master key. The method may further include sending the context cookie to the device and removing the device context from the network node, wherein the device context is not maintained in a state-table of the network node. In some aspects, the method may further include obtaining, in uplink traffic from the device, the context cookie and a packet data unit (PDU) protected by the K_UP and sending, if the context cookie and PDU are successfully verified, the PDU to the application server via the network in an absence of a pre-established connection to the network.

According to some aspects, the disclosure may provide a network node, including means for communicating via a network, means for obtaining a request for a context cookie and for mutual authentication from a device, the request including a device certificate signed by an entity, means for obtaining and encrypting a session master key to produce an encrypted session master key, if the device certificate is successfully verified, means for identifying an application server associated with the entity, wherein the network node is permitted to authenticate and permitted to authorize data transfer to the application server via a network using the context cookie, means for sending, as an authentication challenge, the encrypted session master key, a network certificate signed by a mobile network operator of the network, a network node nonce (NNonce), and a signature of the network node to the device, and means for obtaining, in response to the authentication challenge, an authentication response (RES) from the device. According to some implementations, the network node may also include means for obtaining, if the authentication response is equal to an expected authentication response: a device context, the context cookie based on the device context, and a user-plane key (K_UP) based on the session master key. According to some aspects, the network node may further include means for sending the context cookie to the device, means for removing the device context from the network node, wherein the device context is not maintained in a state-table of the network node, means for obtaining, in uplink traffic from the device, the context cookie and a packet data unit (PDU) protected by the K_UP, and means for sending, if the context cookie and PDU are successfully verified, the PDU to the application server via the network in an absence of a pre-established connection to the network. In some aspects of the disclosure, the means for communicating via a network may be implemented using a processing circuit and more particularly may be implemented using a circuit/module for communicating such as the circuit/module for communicating 820 as shown and described in FIG. 8. An example of the means for obtaining a request for a context cookie and for mutual authentication from a device, means for obtaining and encrypting a session master key to produce an encrypted session master key, means for identifying an application server associated with the entity, means for sending, as an authentication challenge, and means for obtaining, in response to the authentication challenge may be implemented using a processing circuit such as processing circuit 810 as shown and described in FIG. 8. In some aspects of the disclosure, the means for obtaining may be implemented using a circuit/module for obtaining such as the circuit/module for obtaining 822 as shown and described in FIG. 8. In some aspects of the disclosure the means for sending the context cookie to the device, means for removing the device context from the network node, means for obtaining, in uplink traffic from the device, the context cookie and a packet data unit (PDU) protected by the K_UP, and means for sending, may be implemented using a processing circuit such as processing circuit 810 as shown and described in FIG. 8.

According to some implementations, the disclosure may also provide non-transitory computer-readable medium storing computer-executable code for wireless communication including code to perform all aspects described above.

According to an implementation, the disclosure may provide a device that may include a communication interface and a processing circuit coupled to the communication interface, where the processing circuit may be configured to, for example, select a network through which the device is authorized to access a service of an entity, send a request for mutual authentication to a network node, the request including a certificate signed by the entity, perform mutual authentication with the network node, obtain a session master key, wherein the session master key is obtained if the device is authenticated to the network and authorized to access a service associated with the network, obtain a user-plane key (K_UP) using the session master key, obtain a context cookie, wherein the context cookie is based on a device context generated by the network node and not maintained in a state-table of the network node, protect a PDU using the K_UP, and send the protected PDU with the context cookie to the network node in an absence of a pre-established connection to the network.

The processing circuit may be further configured to select the network from a list of networks. The service may be a transport service. The session master key and context cookie may be obtained during mutual authentication. The processing circuit may be further configured to obtain a control-plane key (K_CP) using the session master key, and protect the PDU using the K_UP and/or the K_CP. The service of the network may be used to send the protected PDU from the network node to the entity. The session master key may be encrypted by the network node using a device public-key, and the processing circuit may be further configured to decrypt the session master key using a device private-key. The device might not be attached to the network via the network node. The device might not have a subscription to the network. The entity may be an application service provider (ASP). The network node may be an access node or a core network node. The certificate may include a device public-key. The certificate may be replaced by a device identifier, a device public-key, and/or a device public-key identifier. The context cookie may include an identifier of an application server of an entity associated with the device, and represents an authentication of the device to the network and an authorization given to the device to access a transport service of the network to transfer data to the application server of the entity in the absence of the pre-established connection to the network. The processing circuit may be further configured to obtain a packet data unit (PDU) in downlink traffic, wherein the PDU is protected using the K_UP, and verify the PDU using the K_UP.

According to some aspects, the disclosure may provide a method of data transfer operational at a device. The method may include selecting a network through which the device is authorized to access a service of an entity, sending a request for mutual authentication to a network node, the request including a certificate signed by the entity, performing mutual authentication with the network node, obtaining a session master key, wherein the session master key is obtained if the device is authenticated to the network and authorized to access a service associated with network, obtaining a user-plane key (K_UP) using the session master key, obtaining a context cookie, wherein the context cookie is based on a device context generated by the network node and not maintained in a state-table of the network node, protecting a PDU using the K_UP, and sending the protected PDU with the context cookie to the network node in an absence of a pre-established connection to the network.

In some implementations the method may further include selecting the network from a list of networks. The service may be a transport service. The method may further include obtaining a control-plane key (K_CP) using the session master key, and protecting the PDU using the K_UP and/or the K_CP. The session master key may be encrypted by the network node using a device public-key, the method further comprising decrypting the session master key using a device private-key. In some implementations, the method may further comprise obtaining a packet data unit (PDU) in downlink traffic, wherein the PDU is protected using the K_UP, and verifying the PDU using the K_UP.

According to some aspects, the disclosure may provide a device comprising means for communicating via a network, means for selecting the network through which the device is authorized to access a service of an entity, means for sending a request for mutual authentication to a network node, the request including a certificate signed by the entity, means for performing mutual authentication with the network node, means for obtaining a session master key, wherein the session master key is obtained if the device is authenticated to the network and authorized to access a service associated with network, means for obtaining a user-plane key (K_UP) using the session master key, means for obtaining a context cookie, wherein the context cookie is based on a device context generated by the network node and not maintained in a state-table of the network node, means for protecting a PDU using the K_UP, and means for sending the protected PDU with the context cookie to the network node in an absence of a pre-established connection to the network. In some aspects of the disclosure the means for communicating via a network may be implemented using a circuit/module for communicating such as the circuit/module for communicating 620 as shown and described in FIG. 6. In some aspects of the disclosure, the means for selecting the network through which the device is authorized to access a service of an entity may be implemented using a processing circuit such as the processing circuit 610 as shown and described in FIG. 6. In some aspects of the disclosure, the means for sending a request for mutual authentication to a network node may be implemented by a transmitter such as the transmitter 614 as shown and described in FIG. 6. In some aspects, the means for performing mutual authentication with the network node, means for obtaining a session master key, means for obtaining a user-plane key (K_UP) using the session master key, means for obtaining a context cookie, and means for protecting a PDU using the K_UP may be implemented by a processing circuit such as the processing circuit 610 as shown and described in FIG. 6. In some aspects, the means for sending the protected PDU with the context cookie to the network node in an absence of a pre-established connection to the network may be implemented by the transmitter such as the transmitter 614 as shown and described in FIG. 6 and/or a circuit/module for sending such as the circuit/module for sending 626 as shown and described in FIG. 6.

According to some aspects, the disclosure may provide for a non-transitory computer-readable medium storing computer-executable code for wireless communication including code to select a network through which the device is authorized to access a service of an entity, send a request for mutual authentication to a network node, the request including a certificate signed by the entity, perform mutual authentication with the network node, obtain a session master key, wherein the session master key is obtained if the device is authenticated to the network and authorized to access a service associated with the network, obtain a user-plane key (K_UP) using the session master key, obtain a context cookie, wherein the context cookie is based on a device context generated by the network node and not maintained in a state-table of the network node, protect a PDU using the K_UP, and send the protected PDU with the context cookie to the network node in an absence of a pre-established connection to the network.

According to some aspects, the disclosure may provide a network node, comprising a communication interface, and a processing circuit coupled to the communication interface, where the processing circuit may be configured to obtain a request for a context cookie and for mutual authentication from a device, the request including a device certificate signed by an entity, obtain and encrypt a session master key to produce an encrypted session master key, if the device certificate is successfully verified, identify an application server associated with the entity, wherein the network node is permitted to authenticate and permitted to authorize data transfer to the application server via a network using the context cookie, send, as an authentication challenge, the encrypted session master key, a network certificate signed by a mobile network operator of the network, a network node nonce (NNonce), and a signature of the network node to the device, obtain, in response to the authentication challenge, an authentication response (RES) from the device, obtain, if the authentication response is equal to an expected authentication response: a device context, the context cookie based on the device context, and a user-plane key (K_UP) based on the session master key. The processing circuit may be further configured to send the context cookie to the device, remove the device context from the network node, wherein the device context is not maintained in a state-table of the network node, obtain, in uplink traffic from the device, the context cookie and a packet data unit (PDU) protected by the K_UP, and send, if the context cookie and PDU are successfully verified, the PDU to the application server via the network in an absence of a pre-established connection to the network.

In some implementations, the processing circuit may be further configured to obtain the user-plane key (K_UP) and/or a control-plane key (K_CP) based on the session master key, if the authentication response is equal to the expected authentication response, and obtain, in uplink traffic from the device, the context cookie and the packet data unit (PDU) protected by the K_UP and/or the K_CP. The session master key may be encrypted using a device public-key included in the device certificate. In some aspects, the device is not attached to the network via the network node. In some aspects, the device does not have a subscription to the network. In some implementations, wherein if uplink traffic from the device is not in a form of a PDU, the processing circuit may be further configured to package the uplink traffic as Internet Protocol (IP) data in a PDU. The entity may be an application service provider (ASP). The network node may be an access node or a core network node. The device certificate may include a device public-key. The device certificate may be replaced by a device identifier, a device public-key, and/or a device public-key identifier.

In some implementations, the device certificate may be sent in a message whose content is prohibited from being transferred to the entity in an absence of verification. In some implementations the network node further comprises a memory device, the memory device storing a network node public-key and a network node private-key, the network certificate signed by the mobile network operator, and a list of application service providers whose devices the network node is permitted to authenticate and permitted to authorize data transfer to an associated application server via the network using the context cookie. The list of application service providers may include, for each application service provider (ASP) on the list, an ASP identifier, and an ASP certificate, an ASP public-key, and/or an ASP public-key identifier. The list of application service providers may be obtained from a mobile network operator and may be based on a service level agreement between the mobile network operator and the entity.

In some aspects, the network node is an access node and the processing circuit is further configured to implement data transfer using the context cookie in an absence of establishment of a bearer between the access node and a user-plane gateway in a core network. In some aspects, the network node is an access node and the processing circuit is further configured to obtain the PDU and context cookie in an absence of performing an authentication and key agreement (AKA) procedure between the device and a core network. The processing circuit may be further configured to obtain information as to how and/or where to forward and/or process the PDU obtained from the device. In some aspects, the entity is an application service provider and the processing circuit sends the PDU to the application server of the entity by being further configured to identify the entity from an application service provider identifier included in the PDU, a device public-key, or the PDU and the device public-key. In some aspects, if the uplink traffic is not in PDU form, the processing circuit is further configured to convert the uplink traffic into Internet Protocol (IP) packets on behalf of the device, and send the IP packets in the PDU to the application server. In some aspects, the processing circuit is further configured to obtain a packet data unit (PDU) in downlink traffic, protect the PDU using the K_UP, and send the protected PDU to the device.

According to some aspects, the disclosure may provide a method of data transfer data, operational at a network node. The method of data transfer may include obtaining a request for a context cookie and for mutual authentication from a device, the request including a device certificate signed by an entity, obtaining and encrypting a session master key to produce an encrypted session master key, if the device certificate is successfully verified, identifying an application server associated with the entity, wherein the network node is permitted to authenticate and permitted to authorize data transfer to the application server via a network using the context cookie, sending, as an authentication challenge, the encrypted session master key, a network certificate signed by a mobile network operator of the network, a network node nonce (NNonce), and a signature of the network node to the device, obtaining, in response to the authentication challenge, an authentication response (RES) from the device, obtaining, if the authentication response is equal to an expected authentication response: a device context, the context cookie based on the device context, and a user-plane key (K_UP) based on the session master key. The method of data transfer may further include sending the context cookie to the device, removing the device context from the network node, wherein the device context is not maintained in a state-table of the network node, obtaining, in uplink traffic from the device, the context cookie and a packet data unit (PDU) protected by the K_UP, and sending, if the context cookie and PDU are successfully verified, the PDU to the application server via the network in an absence of a pre-established connection to the network.

The method may further include obtaining the user-plane key (K_UP) and/or a control-plane key (K_CP) based on the session master key, if the authentication response is equal to the expected authentication response, and obtaining, in uplink traffic from the device, the context cookie and the packet data unit (PDU) protected by the K_UP and/or the K_CP. If uplink traffic from the device is not in a form of a PDU, the method may further include packaging the uplink traffic as Internet Protocol (IP) data in a PDU. According to some aspects, the network node is an access node and the method further includes implementing data transfer using the context cookie in an absence of establishment of a bearer between the access node and a user-plane gateway in a core network. According to some aspects, the network node is an access node and the method further includes obtaining the PDU and context cookie in an absence of performing an authentication and key agreement (AKA) procedure between the device and a core network. According to some aspects, the method further includes obtaining a packet data unit (PDU) in downlink traffic, protecting the PDU using the K_UP, and sending the protected PDU to the device.

According to some aspects, the disclosure may provide a network node, including means for communicating via a network, means for obtaining a request for a context cookie and for mutual authentication from a device, the request including a device certificate signed by an entity, means for obtaining and encrypting a session master key to produce an encrypted session master key, if the device certificate is successfully verified, means for identifying an application server associated with the entity, wherein the network node is permitted to authenticate and permitted to authorize data transfer to the application server via a network using the context cookie, means for sending, as an authentication challenge, the encrypted session master key, a network certificate signed by a mobile network operator of the network, a network node nonce (NNonce), and a signature of the network node to the device, means for obtaining, in response to the authentication challenge, an authentication response (RES) from the device, means for obtaining, if the authentication response is equal to an expected authentication response, a device context, the context cookie based on the device context, and a user-plane key (K_UP) based on the session master key. According to some aspects, the network node may further include means for sending the context cookie to the device, means for removing the device context from the network node, wherein the device context is not maintained in a state-table of the network node, means for obtaining, in uplink traffic from the device, the context cookie and a packet data unit (PDU) protected by the K_UP, and means for sending, if the context cookie and PDU are successfully verified, the PDU to the application server via the network in an absence of a pre-established connection to the network. According to some aspects of the disclosure the means for communicating via a network, may be implemented using a circuit/module for communicating such as the circuit/module for communicating 820 as shown and described in FIG. 8. In some aspects of the disclosure, the means for obtaining a request for a context cookie and for mutual authentication from a device, the means for obtaining and encrypting a session master key to produce an encrypted session master key, the means for identifying an application server associated with the entity may be implemented using a processing circuit such as the processing circuit 810 as shown and described in FIG. 8. According to some aspects, the means for sending the encrypted session master key, a network certificate signed by a mobile network operator of the network, a network node nonce (NNonce), and a signature of the network node to the device may be implemented using a transmitter such as the transmitter 814 as shown and described in FIG. 8 and/or the circuit/module for sending 826 as shown and described in FIG. 8. According to some aspects, the means for obtaining, in response to the authentication challenge, an authentication response (RES) from the device, means for obtaining, if the authentication response is equal to an expected authentication response, a device context, the context cookie based on the device context, and a user-plane key (K_UP) based on the session master key may be implemented by the circuit/module for obtaining 822 as shown and described in FIG. 8. According to some aspects, the means for sending the context cookie to the device may be implemented using a transmitter such as the transmitter 814 as shown and described in FIG. 8 and/or the circuit/module for sending 826 as shown and described in FIG. 8. According to some aspects of the disclosure the means for removing the device context from the network node may be implemented by a processing circuit such as the processing circuit 810 as shown and described in FIG. 8. According to some aspects of the disclosure, the means for obtaining the context cookie and a packet data unit (PDU) protected by the K_UP may be implemented by the circuit/module for obtaining 822 as shown and described in FIG. 8. According to some aspects of the disclosure, the means for sending the PDU to the application server via the network in an absence of a pre-established connection to the network may be implemented by a circuit/module for sending 826 as shown and described in FIG. 8.

According to some aspects, the disclosure may provide a non-transitory computer-readable medium storing computer-executable code for wireless communication including code to obtain a request for a context cookie and for mutual authentication from a device, the request including a device certificate signed by an entity, obtain and encrypt a session master key to produce an encrypted session master key, if the device certificate is successfully verified, identify an application server associated with the entity, wherein the network node is permitted to authenticate and permitted to authorize data transfer to the application server via a network using the context cookie, send, as an authentication challenge, the encrypted session master key, a network certificate signed by a mobile network operator of the network, a network node nonce (NNonce), and a signature of the network node to the device, obtain, in response to the authentication challenge, an authentication response (RES) from the device, obtain, if the authentication response is equal to an expected authentication response, a device context, the context cookie based on the device context, and a user-plane key (K_UP) based on the session master key. The non-transitory computer-readable medium may further store computer-executable code for wireless communication including code to send the context cookie to the device, remove the device context from the network node, wherein the device context is not maintained in a state-table of the network node, obtain, in uplink traffic from the device, the context cookie and a packet data unit (PDU) protected by the K_UP, and send, if the context cookie and PDU are successfully verified, the PDU to the application server via the network in an absence of a pre-established connection to the network.

As those of ordinary skill in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA 2000, Evolution-Data Optimized (EV-DO), Ultra Mobile Broadband (UMB), IEEE 802.11 (Wi-Fi), IEEE 802.16 (WiMAX), IEEE 802.20 (Mobile Broadband Wireless Access), Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect mechanical and/or electrical coupling between two objects. For example, if object A physically touches and/or electrically communicates with object B, and object B physically touches and/or electrically communicates with object C, then objects A and C may still be considered coupled to one another—even if they do not directly physically touch and/or electrically communicate with each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features, and/or functions illustrated in above may be rearranged and/or combined into a single component, block, feature, or function or implemented in several components, blocks, features, and/or functions. Additional components, blocks, features, and/or functions may also be added without departing from novel features disclosed herein. The apparatus, devices, and/or components illustrated above may be adapted (e.g., constructed, configured, employed, implemented, and/or programmed) to perform one or more of the methods, blocks, features, and/or functions described herein. The algorithms described herein may also be efficiently implemented in software and/or embedded in hardware.

It is to be understood that the specific order or hierarchy of blocks in the methods disclosed is an illustration of exemplary processes. It is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A device, comprising:
   a communication interface; and
   a processing circuit coupled to the communication interface, the processing circuit configured to:
   select a network through which the device is authorized to access a service associated with an entity, wherein the entity is different from the device and is not a network node of the network and is associated with a set of security information and the set of security information is provisioned to the device by the entity;
   send the set of security information to a first network node of the network;
   obtain a random number in response to the sending the set of security information;
   obtain a signature of the device by signing a message, which includes the random number and data to be transferred, with a device private-key, wherein a device public-key is associated with the set of security information;
   send the data and the signature to the first network node to transfer the data via the first network node in an absence of a pre-established connection to the network;
   provide a device-nonce (DNonce) to the first network node, wherein the DNonce is randomly generated by the device;
   obtain a network certificate signed by a mobile network operator;
   obtain a packet data unit (PDU) in downlink traffic, wherein the PDU is associated with a signature of the first network node;
   verify the network certificate using a public-key of the mobile network operator, wherein the network certificate includes a public-key of the first network node; and
   verify the signature of the first network node using the public-key of the first network node and a message including the DNonce and the PDU.

2. A method of data transfer operational at a device, comprising:
   selecting a network through which the device is authorized to access a service associated with an entity, wherein the entity is different from the device and is not a network node of the network and is associated with a set of security information and the set of security information is provisioned to the device by the entity;
   sending the set of security information to a first network node of the network;
   obtaining a random number in response to the sending the set of security information;
   obtaining a signature of the device by signing a message, which includes the random number and data to be transferred, with a device private-key, wherein a device public-key is associated with the set of security information;
   sending the data and the signature to the first network node to transfer the data via the first network node in an absence of a pre-established connection to the network;
   providing a device-nonce (DNonce) to the first network node, wherein the DNonce is randomly generated by the device;
   obtaining a network certificate signed by a mobile network operator;
   obtaining a packet data unit (PDU) in downlink traffic, wherein the PDU is associated with a signature of the first network node;
   verifying the network certificate using a public-key of the mobile network operator, wherein the network certificate includes a public-key of the first network node; and
   verifying the signature of the first network node using the public-key of the network node and a message including the DNonce and the PDU.

* * * * *